US011419331B2

(12) United States Patent
Deng et al.

(10) Patent No.: US 11,419,331 B2
(45) Date of Patent: Aug. 23, 2022

(54) MICROENCAPSULATED ACETAMIDE HERBICIDES

(71) Applicant: Monsanto Technology LLC, St. Louis, MO (US)

(72) Inventors: Wenjin Deng, St. Louis, MO (US); Todd Friedman, Arnold, MO (US); John Hemminghaus, St. Louis, MO (US); Thimmareddy Thatiparti, Chesterfield, MO (US); Junhua Zhang, Chesterfield, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 16/776,651

(22) Filed: Jan. 30, 2020

(65) Prior Publication Data

US 2020/0236928 A1 Jul. 30, 2020

Related U.S. Application Data

(60) Provisional application No. 62/798,835, filed on Jan. 30, 2019.

(51) Int. Cl.
| | | |
|---|---|---|
| *A01N 25/28* | (2006.01) | |
| *A01N 25/04* | (2006.01) | |
| *A01N 25/10* | (2006.01) | |
| *A01N 25/32* | (2006.01) | |
| *A01N 39/04* | (2006.01) | |
| *A01N 57/20* | (2006.01) | |
| *A01N 37/26* | (2006.01) | |

(52) U.S. Cl.
CPC ............ *A01N 25/28* (2013.01); *A01N 25/04* (2013.01); *A01N 25/10* (2013.01); *A01N 25/32* (2013.01); *A01N 37/26* (2013.01); *A01N 39/04* (2013.01); *A01N 57/20* (2013.01)

(58) Field of Classification Search
None
See application file for complete search history.

(56) References Cited

U.S. PATENT DOCUMENTS

| | | |
|---|---|---|
| 3,516,846 A | 6/1970 | Matson |
| 3,516,941 A | 6/1970 | Matson |
| 3,959,464 A | 5/1976 | Desavigny |
| 4,021,224 A | 5/1977 | Pallos et al. |
| 4,107,292 A | 8/1978 | Nemeth |
| 4,193,889 A | 3/1980 | Baatz et al. |
| 4,280,833 A | 7/1981 | Beestman et al. |
| 4,285,720 A | 8/1981 | Scher |
| 4,356,108 A | 10/1982 | Schwab et al. |
| 4,417,916 A | 11/1983 | Beestman et al. |
| 4,428,983 A | 1/1984 | Nehen et al. |
| 4,480,082 A | 10/1984 | McLean et al. |
| 4,489,017 A | 12/1984 | Alberts et al. |
| 4,563,212 A * | 1/1986 | Becher .................... B01J 13/16 71/11 |
| 4,599,271 A | 7/1986 | Chao |
| 4,640,709 A | 2/1987 | Beestman |
| 4,643,764 A | 2/1987 | Scher |
| 4,668,580 A | 5/1987 | Dahm et al. |
| 4,670,246 A | 6/1987 | Dahl et al. |
| 4,681,806 A | 7/1987 | Matkan et al. |
| 4,738,898 A | 4/1988 | Vivant |
| 4,847,152 A | 7/1989 | Jabs et al. |
| 4,859,788 A | 8/1989 | Brindopke et al. |
| 4,889,719 A | 12/1989 | Ohtsubo et al. |
| 4,936,901 A | 6/1990 | Surgant, Sr. et al. |
| 4,938,797 A | 7/1990 | Hasslin et al. |
| 4,956,129 A | 9/1990 | Scher et al. |
| 5,006,161 A | 4/1991 | Hasslin et al. |
| 5,049,182 A | 9/1991 | Scher et al. |
| 5,223,477 A | 6/1993 | Scher et al. |
| 5,310,721 A | 5/1994 | Lo |
| 5,342,556 A | 8/1994 | Traubel et al. |
| 5,354,742 A | 10/1994 | Deming et al. |
| 5,461,027 A | 10/1995 | Bergman |
| 5,463,175 A | 10/1995 | Barry et al. |
| 5,583,090 A | 12/1996 | Stern et al. |
| 5,686,384 A | 11/1997 | Hester |
| 5,783,520 A | 7/1998 | Anderson et al. |
| 5,925,464 A | 7/1999 | Mulqueen et al. |
| 5,925,595 A | 7/1999 | Seitz et al. |
| 6,020,066 A | 2/2000 | Weisser et al. |
| 6,133,197 A | 10/2000 | Chen et al. |

(Continued)

FOREIGN PATENT DOCUMENTS

| | | | |
|---|---|---|---|
| CN | 106538551 A | * | 3/2017 |
| EP | 0008207 A2 | | 2/1980 |

(Continued)

OTHER PUBLICATIONS

Christian et al.( Controlled Release of Insecticides through Polycondensation, Asian Journal of Chemistry (2018), 30(11), 2571-2576) (Year: 2018).*
Yadav et al.( Microencapsulation in polyurea shell by interfacial polycondensation, AIChE Journal (1990), 36(3), 431-8) (Year: 1990).*
Han, X., "Pesticide Introduction," 1995, China Agricultural University Press, pp. 37-38, 6 pages.
Parker, D.C., et al., "Fall and Early Preplant Application Timing Effects on Persistence and Efficacy of Acetamide Herbicides," 2005, Weed Technology, 19:6-13.
Scher, H.B., et al., "Microencapsulation of Pesticides by Interfacial Polymerization Utilizing Isocyanate or Aminoplast Chemistry," 1998, Pesti Sci, 54/4:394-400, XP-000804298.
Wilson, R., "Chapter 20: Encapsulated Acetochlor for Selective Weed Control in Roundup-Ready Sugarbeets," 2010, 2009 Weed Control Report, http://panhandle.unl.edu/c/document_library/get_file?uuid+a97205bc-1618-4ffc-ac2d-45bf5ee801b5&groupId=131817, 3 pages.

(Continued)

*Primary Examiner* — Alton N Pryor
(74) *Attorney, Agent, or Firm* — Harness, Dickey & Pierce, P.L.C.

(57) ABSTRACT

The present invention relates to various herbicidal compositions comprising microcapsules containing an acetamide herbicide. The present invention also relates to processes for preparing these compositions and methods of using these compositions for controlling weeds.

30 Claims, No Drawings

(56) References Cited

U.S. PATENT DOCUMENTS

| | | | |
|---|---|---|---|
| 6,337,130 B1 | 1/2002 | Van Koppenhagen et al. |
| 6,340,653 B1 | 1/2002 | Scher et al. |
| 6,485,736 B1 | 11/2002 | Shirley et al. |
| 6,566,306 B1 | 5/2003 | Wolf et al. |
| 6,653,256 B1 | 11/2003 | Wolf et al. |
| 6,730,635 B2 | 5/2004 | Wolf et al. |
| 6,740,488 B2 | 5/2004 | Rangwala et al. |
| 6,992,047 B2 | 1/2006 | Asrar et al. |
| 7,056,522 B2 | 6/2006 | Voris et al. |
| 7,199,185 B2 | 4/2007 | Heming et al. |
| 7,381,861 B2 | 6/2008 | Cerny et al. |
| 7,687,434 B2 | 3/2010 | De Billot et al. |
| 7,718,572 B2 | 5/2010 | Igari et al. |
| 7,754,655 B2 | 7/2010 | Wolf et al. |
| 9,743,664 B2 | 8/2017 | Hemminghaus et al. |
| 9,877,478 B2 | 1/2018 | Becher et al. |
| 9,913,469 B2 | 3/2018 | Findley et al. |
| 2003/0022791 A1 | 1/2003 | Asrar et al. |
| 2004/0137031 A1 | 7/2004 | Seitz et al. |
| 2004/0258753 A1 | 12/2004 | Demeester et al. |
| 2005/0208089 A1 | 9/2005 | Asrar et al. |
| 2005/0233907 A1 | 10/2005 | Nabors et al. |
| 2005/0277549 A1 | 12/2005 | Seitz et al. |
| 2008/0242548 A1 | 10/2008 | Asrar et al. |
| 2009/0105077 A1 | 4/2009 | Bhatti et al. |
| 2010/0022697 A1 | 1/2010 | Rodriguez et al. |
| 2010/0323893 A1 | 12/2010 | Ikeda |
| 2012/0129694 A1* | 5/2012 | Ditmarsen ............ A01N 25/28 504/107 |
| 2012/0184434 A1 | 7/2012 | Xu et al. |
| 2014/0128264 A1 | 5/2014 | Hemminghaus et al. |
| 2015/0208653 A1 | 7/2015 | Becher |
| 2016/0192645 A1 | 7/2016 | Zhang et al. |
| 2020/0163331 A1* | 5/2020 | Hemminghaus ....... A01N 25/04 |

FOREIGN PATENT DOCUMENTS

| | | |
|---|---|---|
| EP | 0148149 A2 | 7/1985 |
| EP | 0252896 A2 | 1/1988 |
| EP | 0369614 A1 | 5/1990 |
| EP | 0679333 A1 | 11/1995 |
| EP | 0780154 A1 | 6/1997 |
| JP | 09-249505 | 9/1997 |
| WO | 81/02505 A1 | 9/1981 |
| WO | 92/13450 A1 | 8/1992 |
| WO | 00/05951 A1 | 2/2000 |
| WO | 00/05952 A1 | 2/2000 |
| WO | 01/10414 A1 | 2/2001 |
| WO | 01/94001 A2 | 12/2001 |
| WO | 01/96010 A1 | 12/2001 |
| WO | 2002036782 A2 | 5/2002 |
| WO | 02/082901 A1 | 10/2002 |
| WO | 2003092360 A2 | 11/2003 |
| WO | 2005/012488 A2 | 2/2005 |
| WO | 2005012515 A2 | 2/2005 |
| WO | 2005/122759 A1 | 12/2005 |
| WO | 2009/103455 A2 | 8/2009 |

OTHER PUBLICATIONS

Zhang, B., et al., "Pesticide Processing Technology," 1996, Central Plains Farmer Press, pp. 64-65 and 74-76, 11 pages.
2010 Research Progress Report, Mar. 8-11, 2010, Western Society of Weed Science, Waikoloa, Hawaii, http://www.wsweedscience.org/Research Report Archive/2010 WSWS RPR.pdf, 146 pages.
Stern, A.J., et al., "Chapter 7. Microencapsulation Technology and Future Trends," 1996, Foy and Pritchard, Eds., pp. 93-114, 24 pages.
Specimen Label Degree® Herbicide, Monsanto Company, EPA Reg. No. 524-496, 2012, 8 pages.
Specimen Label Harness® Herbicide by Monsanto, EPA Reg. No. 524-473, 2012, 9 pages.
Translation to English of EP 0780154 A1, Published Jun. 25, 1997, Applicant Bayer AG, 6 Pages.
Huston, P. L., et al., "Degradation of Selected Pesticide Active Ingredients and Commercial Formulations in Water by the Photo-Assisted Fenton Reaction," 1999, Wat Res, 33/5:1238-1246, 9 pages.
Pilon, P., "Pre-emergent Herbicide Application Guidelines," 2010, retreived from http://betterplants.basf.us/news-&-events/featured-stories/archived-featured-stories/pre-emergent-herbicide-guidelines-paul-pilon.html, Apr. 14, 2014, 2 pages.
MICRO-TECH@ Herbicide, by Monsanto, Product Label, EPA Reg. No. 524-344, Copyright 2010, 19 pages.
"PAPI 135 Polymeric MDI," Dow Plastics, Mar. 2001, pp. 1-4.

* cited by examiner

MICROENCAPSULATED ACETAMIDE HERBICIDES

CROSS-REFERENCE TO RELATION APPLICATION

This application claims priority to U.S. Provisional Patent Application No. 62/798,835, filed Jan. 30, 2019, which is hereby incorporated by reference in its entirety.

FIELD

The present invention relates to various herbicidal compositions comprising microcapsules containing an acetamide herbicide. The present invention also relates to processes for preparing these compositions and methods of using these compositions for controlling weeds.

BACKGROUND

Microencapsulation of herbicides is one method for controlling the release of the herbicide after application, particularly when sustained or slow release of the herbicide is desired. In the case of certain herbicides, the release rate is controlled to provide for longer residual weed control activity and manage potential for crop injury. Methods for producing microencapsulated acetamides are described in various patents and publications including U.S. Pat. Nos. 5,925,595 and 9,877,478 and U.S. Publication No. 2004/0137031.

Concentrate compositions containing high loadings of active ingredients are more economical to transport and store than dilute compositions. However, highly concentrated compositions can be challenging to formulate because of formulation instability, especially with dispersions, such as aqueous dispersions of microencapsulated acetamide herbicides. As the concentration of microencapsulated acetamide herbicide increases, the herbicidal composition may experience bottom settling, top clearing, or floating capsules depending on the concentration and additives. Thus, there remains a need for formulation strategies that provide for concentrate compositions containing high loadings of microencapsulated acetamide herbicides that are stable over a wide range of storage conditions.

Further, to enhance the efficiency of applying herbicidal active ingredients, it is highly desirable to combine two or more active ingredients in a single formulation. Compositions containing a combination of active ingredients with different modes of action can provide for greater pest control and are beneficial for avoiding or reducing mixing errors when preparing the application mixture in the field. However, the release properties of herbicidal concentrates of microencapsulated acetamide herbicides can be sensitive to the inclusion of further additives including co-herbicides. Thus, there remains a need for formulation strategies that provide for concentrate compositions containing high loadings of microencapsulated acetamide herbicides and optionally including one or more other herbicides that are stable over a wide range of conditions and that maintain the controlled release properties of the microencapsulated acetamide herbicide.

BRIEF SUMMARY

Various aspects of the present invention are directed to herbicidal concentrate compositions comprising herbicidal microcapsules as described herein, which are dispersed in an aqueous liquid medium wherein the composition has an acetamide herbicide concentration of at least about 40 wt. %. Various compositions have a weight ratio of acetamide herbicide to shell wall that is at least about 12:1.

Other aspects of the present invention are directed to a herbicidal concentrate compositions comprising microcapsules dispersed in an aqueous liquid medium, wherein the microcapsules comprise a core material comprising an acetamide herbicide and a shell wall comprising a polyurea encapsulating the core material, and wherein the composition has an acetamide herbicide concentration on an active ingredient basis of at least about 40 wt. % and contains no more than about 15 wt. %, no more than about 10 wt. %, no more than about 5 wt. %, no more than about 3 wt. % or no more than about 1 wt. % of unencapsulated additives, excluding water and any co-herbicide(s).

Further aspects of the present invention are directed to methods for controlling weeds in a field of a crop plant. The methods comprise applying to the field an application mixture comprising the herbicidal compositions as described herein or dilution thereof.

Still further aspects are directed to processes for preparing the concentrate compositions. In general, the processes comprise forming herbicidal microcapsules by encapsulating a core material comprising an acetamide herbicide in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium, and dispersing the microcapsules in an aqueous medium.

Other objects and features will be in part apparent and in part pointed out hereinafter.

DETAILED DESCRIPTION

Generally, the present invention relates to various herbicidal compositions comprising microcapsules containing an acetamide herbicide. The present invention also relates to processes for preparing these compositions and methods of using these compositions. In particular, various embodiments are directed to herbicidal concentrate compositions comprising acetamide-containing microcapsules dispersed in an aqueous liquid medium. Further embodiments are directed to application mixtures prepared from the concentration compositions and methods of using these compositions for controlling weeds.

Various aspects of the present invention provide for stable herbicidal compositions comprising high loadings of a microencapsulated acetamide herbicide. These highly concentrated compositions are more economical and convenient to transport and store as compared to less concentrated compositions.

Other aspects of the present invention provide for herbicidal compositions comprising a microencapsulated acetamide herbicide that exhibit enhanced compatibility with other additives such as co-herbicides. Compositions with greater compatibility for additives such as co-herbicides are beneficial for preparing pre-mixed concentrate compositions. These compositions are useful for providing compositions with multiple modes of herbicidal action and are especially convenient for agricultural workers.

I. Microencapsulated Acetamides

In general, the herbicidal compositions of the present invention comprise microcapsules comprising (a) a core material comprising an acetamide herbicide and (b) a shell wall encapsulating the core material.

Core Material

As noted, the core material comprises an acetamide herbicide. Acetamide herbicides are a group of structurally related herbicides that include acetanilide herbicides (e.g., chloroacetanilide herbicides) and other amide-containing herbicides. Examples of acetamide herbicides suitable for microencapsulation include herbicides such as acetochlor, alachlor, butachlor, butenachlor, delachlor, diethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof. Some acetamide herbicides are available in their free forms, as salts, or as derivatized materials, for example, as esters. In further embodiments, the acetamide herbicide is selected from the group consisting of acetochlor, alachlor, metolachlor, S-metolachlor, dimethenamid, dimethenamid-P, butachlor, stereoisomers thereof, and mixtures thereof. In certain embodiments, the acetamide herbicide is selected from the group consisting of acetochlor, metolachlor S-metolachlor, and mixtures thereof. In some embodiments, the acetamide herbicide comprises acetochlor.

Chloroacetanilide herbicides are one subgroup of acetamide herbicides. In various embodiments, the acetamide herbicide comprises a chloroacetanilide herbicide. In these and other embodiments, the acetamide herbicide comprises at least one chloroacetanilide herbicide selected from the group consisting of acetochlor, alachlor, butachlor, butenachlor, delachlor, diethatyl, dimethachlor, metazochlor, metolachlor, S-metolachlor, pretilachlor, propachlor, propisochlor, prynachlor, terbuchlor, thenylchlor and xylachlor, stereoisomers thereof, and mixtures thereof. In some embodiments, the acetamide herbicide comprises at least one chloroacetanilide herbicide selected from the group consisting of the group consisting of acetochlor, alachlor, butachlor, metolachlor, S-metolachlor, stereoisomers thereof, and mixtures thereof.

Typically the acetamide herbicide constitutes a large percentage of the microcapsule weight. For instance, the acetamide herbicide can constitute at least about 40 wt. %, at least about 42 wt. %, at least about 44 wt. %, at least about 46 wt. %, at least about 48 wt. %, at least about 50 wt. %, at least about 55 wt. %, at least about 60 wt. %, or at least about 65 wt. % of the microcapsule. In various embodiments, the acetamide herbicide constitutes from about 40 wt. % to about 60 wt. %, from about 40 wt. % to about 55 wt. %, from about 40 wt. % to about 50 wt. %, from about 40 wt. % to about 48 wt. %, from about 40 wt. % to about 46 wt. %, or from about 40 wt. % to about 44 wt. % of the microcapsule.

In some embodiments, the acetamide herbicide is the only herbicide present in the core material. In these and other embodiments, the core material consists or consists essentially of the acetamide herbicide (e.g., the acetamide herbicide constitutes at least about 95 wt. % or at least 99 wt. % of the core material).

The core material can further comprise one or more additives including a safener or diluent (e.g., additional solvent). In some embodiments, the core material comprises a safener. Safeners include, for example, furilazole ((RS)-3-(dichloroacetyl)-5-(2-furanyl)-2,2-dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy)acetic acid); cyometrinil ((Z)-cyanomethoxyimino(phenyl)acetonitrile); cyprosulfamide (N-[4-(cyclopropylcarbamoyl)phenylsulfonyl]-o-anisamide); dichlormid (N, N-diallyl-2, 2-dichloroacetamide); dicyclonon ((RS)-1-dichloroacetyl-3,3,8a-trimethylperhydropyrrolo[1,2-a]pyrimidin-6-one); dietholate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)—O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino(phenyl)acetonitrile); isoxadifen (4,5-dihydro-5,5-diphenyl-1,2-oxazole-3-carboxylic acid); cyprosulfamide; salts and esters thereof, and mixtures thereof.

The core material may further comprise a diluent. A diluent, such as a solvent, may be added to change the solubility parameter characteristics of the core material to increase or decrease the release rate of the herbicides from the microcapsule once release has been initiated. In some embodiments, the diluent is a water-insoluble organic solvent having a solubility of less than about 10, less than about 5, less than about 1, less than about 0.5 or even less than about 0.1 gram per liter at 25° C.

Exemplary diluents include, for example: alkyl-substituted biphenyl compounds (e.g., SureSol 370, commercially available from Koch Co.); normal paraffin oil (e.g., NORPAR 15, commercially available from Exxon); mineral oil (e.g., ORCHEX 629, commercially available from Exxon); isoparaffin oils (e.g., ISOPAR V and ISOPAR L, commercially available from Exxon); aliphatic fluids or oils (e.g., EXXSOL D110 and EXXSOL D130, commercially available from Exxon); alkyl acetates (e.g., EXXATE 1000, formerly commercially available from Exxon); aromatic fluids or oils (A 200, commercially available from Exxon); citrate esters (e.g., Citroflex A4, commercially available from Modlex); and, plasticizing fluids or oils used in, for examples, plastics (typically high boiling point esters). In some embodiments, the diluent comprises a paraffinic hydrocarbon solvent, preferably containing predominantly a linear or branched hydrocarbon such as pentadecane, ISOPAR V, and ISOPAR M. In some embodiments the diluent is selected from the group consisting of paraffin oil, isoparaffin oil, aliphatic fluids or oils, aromatic hydrocarbon solvents, and combinations thereof.

The core material may comprise from 0% to about 35 wt. % of a diluent, for example from about 0.1 wt. % to about 25 wt. %, from about 0.5 wt. % to about 20 wt. %, from about 1 wt. % to about 10 wt. %, from about 2 wt. % to about 10 wt. %, from about 2 wt. % to about 8 wt. %, from about 3 wt. % to about 7 wt. %, or from about 4 wt. % to about 6 wt. %. In particular, the core material may comprise 0 wt. %, 0.5 wt. % 1 wt. %, 2 wt. %, 3 wt. %, 4 wt. %, 5 wt. %, 6 wt. %, 7 wt. %, 8 wt. %, 10 wt. %, 15 wt. %, 20 wt. %, 25 wt. %, 30 wt. %, or 35 wt. % diluent or any range composed of these weight percentages such as from 0% to 35 wt. %, from 1 wt. % to 30 wt. %, and so on. In some embodiments, the diluent contained in the core material is less than about 5 wt. %, less than about 4 wt. %, less than about 3 wt. %, less than about 2 wt. %, less than about 1 wt. %, less than about 0.5 wt. %, less than about 0.25 wt. %, or less than about 0.1 wt. % of the total composition. For example, the diluent may comprise from about 0.1 wt. % to about 5 wt. %, from about 0.1 wt. % to about 4 wt. %, from about 0.5 wt. % to about 4 wt. %, from about 1 wt. % to about 4 wt. %, or from about 1 wt. % to about 3 wt. % of the total composition. The weight ratio of acetamide herbicide to diluent in the core material can be at least about 17:1, at least about 18:1 at least about 19:1 at least about 20:1 at least about 25:1, at least about 30:1, at least about 40:1, or at least about 50:1. For example, the weight ratio of acetamide herbicide to diluent in the core material can be from about from about 17:1 to about 1000:1, from about 17:1 to about 500:1, from about 17:1 to about 200:1, from about 17:1 to about 100:1, from about 17:1 to about 50:1, from about 20:1 to about 1000:1, from about 20:1 to about 500:1, from about 20:1 to about 200:1, from about 20:1 to about 100:1, from about 20:1 to about 50:1, from about 25:1 to about 1000:1, from about 25:1 to about 500:1, from about 25:1 to about 200:1, from about 25:1 to about 100:1, or from about 25:1 to about 50:1.

In some embodiments, the microcapsules are essentially free of a diluent (e.g., the core material does not contain any diluent or the diluent is less than about 0.5 wt. % or less than about 0.1 wt. % of the core material).

Shell Wall and Formation of Microcapsules

As noted, the herbicidal microcapsules contained in the herbicidal compositions comprise a core material comprising an acetamide herbicide and a shell wall containing the core material. In general, the shell wall comprises a polyurea.

The process of microencapsulation can be conducted according to interfacial polycondensation techniques. Microencapsulation of water-immiscible materials utilizing an interfacial polycondensation reaction generally involves dissolving a first reactive monomeric or polymeric material(s) (first shell wall component) in the material to be encapsulated (i.e., core material) to form an oil or discontinuous phase liquid. The discontinuous phase liquid is then dispersed into an aqueous or continuous phase liquid to form an oil-in-water emulsion. The continuous phase (aqueous) liquid may contain a second reactive monomeric or polymeric material (second shell wall component) at the time the discontinuous phase is dispersed into the continuous phase. If this is the case, the first and second shell wall components will immediately begin to react at the oil-in-water interface to form a polycondensate shell wall around the material(s) to be encapsulated. However, the oil-in-water emulsion can also be formed before the second shell wall component is added to the emulsion.

The oil-in-water emulsion that is formed during the interfacial polymerization reaction can be prepared by adding the oil phase to the continuous aqueous phase to which an emulsifying agent has been added (e.g., previously dissolved therein). The emulsifying agent is selected to achieve the desired oil droplet size in the emulsion. The size of the oil droplets in the emulsion is impacted by a number of factors in addition to the emulsifying agent employed and determines the size of microcapsules formed by the process. The emulsifying agent is preferably a protective colloid. Polymeric dispersants are preferred as protective colloids. Polymeric dispersants provide steric stabilization to an emulsion by adsorbing to the surface of an oil drop and forming a high viscosity layer which prevents drops from coalescing. Polymeric dispersants may be surfactants and are preferred to surfactants which are not polymeric, because polymeric compounds form a stronger interfacial film around the oil drops. If the protective colloid is ionic, the layer formed around each oil drop will also serve to electrostatically prevent drops from coalescing.

SOKALAN (available from BASF), a maleic acid-olefin copolymer, is a preferred protective colloid, as is INVALON (available from Huntsman) and AGNIQUE NSC 11NP (available from BASF), which are naphthalene sulfonate condensates. Other protective colloids useful in this invention are gelatin, casein, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, sodium and calcium lignosulfonates, sulfonated naphthalene-formaldehyde condensates, modified starches, and modified cellulosics like hydroxyethyl or hydroxypropyl cellulose, and carboxymethyl cellulose.

In general, the polyurea shell wall of the microcapsules of the present inventions is formed in a polymerization medium by a polymerization reaction between a polyisocyanate component comprising a polyisocyanate or mixture of polyisocyanates and a polyamine component comprising a polyamine or mixture of polyamines to form the polyurea. See, for example, U.S. Pat. Nos. 5,925,595 and 9,877,478 and U.S. Publication No. 2004/0137031, which are incorporated herein by reference.

The herbicide encapsulated with a polyurea shell wall for use in the present invention can be prepared by contacting an aqueous continuous phase containing a polyamine component comprising a polyamine source and a discontinuous oil phase containing the acetamide herbicide and a polyisocyanate component comprising a polyisocyanate source. A polyurea shell wall is formed in a polymerization reaction between the polyamine source and the polyisocyanate source at the oil/water interface thereby forming microcapsules containing the herbicide. Accordingly, processes for preparing herbicidal microcapsules generally comprises encapsulating a core material comprising the acetamide herbicide in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium.

As noted herein, the herbicide actives must be compatible with both the microencapsulation process as well as the shell wall material. To be compatible with the microencapsulation process, the core material must be sufficiently water-immiscible such that the material remains in the discontinuous (oil) phase liquid. Water-immiscibility refers to materials that have a relatively low water solubility at about 25° C., for example, less than about 500 mg/L, preferably less than about 250 mg/L, even more preferably less than about 100 mg/L. Certain core materials have even lower water solubility, such as acetochlor, which is less than 25 mg/L at 25° C.

Although the herbicide to be encapsulated may be compatible with the microencapsulation process, this does not mean that the herbicide is necessarily compatible with the shell wall material. It has been observed that some herbicides react with the shell wall after encapsulation causing defects and cracks in the shell wall, which results in uncontrolled herbicide release from the microcapsules.

Thus, various processes of the present invention are directed to preparing herbicidal microcapsules in which acetochlor is the acetamide herbicide. In general, these processes comprise encapsulating a core material comprising the acetochlor in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium.

In general, the polyurea polymer may be formed using one or more polyisocyanates, i.e., having two or more isocyanate groups per molecule. A wide variety of polyisocyanates can be employed. For example, the polyisocyanate component can comprise an aliphatic polyisocyanate (e.g., DESMODUR W, DESMODUR N 3200 and DESMODUR N 3215). In some embodiments, the polyurea shell wall is formed using a blend of at least two polyisocyanates. For example, the polyurea shell wall is formed in an interfacial polymerization reaction using at least one diisocyanate and at least one triisocyanate (e.g., a combination of DESMODUR W and DESMODUR N 3200 or N 3215). In certain embodiments, the polyisocyanate component comprises a polyisocyanate based on hexamethylene-1,6-diisocyanate (e.g., DESMODUR N 3200 or N 3215).

Also, the polyamine source can be a single polyamine species or a mixture of two or more different polyamine species. In various embodiments, the polyamine component comprising a polyamine of the structure $NH_2(CH_2CH_2NH)_mCH_2CH_2NH_2$ where m is from 1 to 5, 1 to 3, or 2. Specific examples of polyamines include substituted or unsubstituted polyethyleneamine, polypropyleneamine, diethylene triamine and triethylenetetramine (TETA). One preferred polyamine is TETA.

It is typically advantageous to select a polyamine component and a polyisocyanate component such that the polyamine has an amine functionality of at least 2, i.e., 3, 4, 5 or more, and at least one of the polyisocyanates has an isocyanate functionality of at least 2, i.e., 2.5, 3, 4, 5, or more since high amine and isocyanate functionality increases the percentage of cross-linking occurring between individual polyurea polymers that comprise the shell wall.

In various embodiments, the polyamine has an amine functionality of greater than 2 and the polyisocyanate is a mixture of polyisocyanates wherein each polyisocyanate has an isocyanate functionality of greater than 2. In other embodiments, the polyamine comprises a trifunctional polyamine and the polyisocyanate component comprises one or more trifunctional polyisocyanates. In yet other embodiments, the shell wall is formed by the reaction between a polyisocyanate or mixture of polyisocyanates with a minimum average of 2.5 reactive groups per molecule and a polyamine with an average of at least three reactive groups per molecule.

Generally, a sufficient amount of polyamine component is provided to the reaction medium such that the polyisocyanate is completely reacted. Complete reaction of the polyisocyanate component increases the percentage of cross-linking between polyurea polymers formed in the reaction thereby providing structural stability to the shell wall. In various embodiments, an equimolar or excess of amine groups to isocyanate groups is supplied to the reaction medium. That is, the molar equivalents ratio of amine equivalents to isocyanate equivalents used in preparation of the shell wall of the microcapsules is typically 1:1 or greater (e.g., at least about 1.01:1, at least about 1.05:1, at least about 1.1:1, at least about 1.15:1, or at least about 1.2:1). However, in some instances, the reaction medium can contain one or more other ingredients besides the polyamine component that can react with the polyisocyanate component. In these instances, the molar equivalents ratio of amine equivalents to isocyanate equivalents can be slightly less than 1:1, such as at least about 0.9:1 or at least about 0.95:1. Accordingly, the ratio of amine molar equivalents contained in the polyamine component to isocyanate molar equivalents contained in the polyisocyanate component can be from about 0.9:1 to about 1.7:1, from about 0.9:1 to about 1.6:1, from about 0.9:1 to about 1.5:1, from about 0.9:1 to about 1.4:1, from about 0.9:1 to about 1.3:1, from about 0.9:1 to about 1.2:1, or from about 0.9:1 to about 1.1:1. Alternatively, the ratio of amine molar equivalents to isocyanate molar equivalents can be from about 0.95:1 to about 1.7:1, from about 0.95:1 to about 1.6:1, from about 0.95:1 to about 1.5:1, from about 0.95:1 to about 1.4:1, from about 0.95:1 to about 1.3:1, from about 0.95:1 to about 1.2:1, or from about 0.95:1 to about 1.1:1. In another embodiment, the ratio of amine molar equivalents to isocyanate molar equivalents can be from about 1:1 to about 1.7:1, from about 1:1 to about 1.6:1, from about 1:1 to about 1.5:1, from about 1:1 to about 1.4:1, or from about 1:1 to about 1.3:1. The ratio of amine molar equivalents to isocyanate molar equivalents can be from about 1.01:1 to about 1.7:1, from about 1.01:1 to about 1.6:1, from about 1.01:1 to about 1.5:1, from about 1.01:1 to about 1.4:1, or from about 1.01:1 to about 1.3:1. In yet another embodiment, the ratio of amine molar equivalents to isocyanate molar equivalents can be from about 1.05:1 to about 1.7:1, from about 1.05:1 to about 1.6:1, from about 1.05:1 to about 1.5:1, from about 1.05:1 to about 1.4:1, or from about 1.05:1 to about 1.3:1. The ratio of amine molar equivalents to isocyanate molar equivalents can be from 1.1:1 to about 1.7:1, from 1.1:1 to about 1.6:1, from 1.1:1 to about 1.5:1, from 1.1:1 to about 1.4:1, or from 1.1:1 to about 1.3:1. The ratio of amine molar equivalents to isocyanate molar equivalents can be from about 1.15:1 to about 1.7:1, from about 1.15:1 to about 1.6:1, from about 1.15:1 to about 1.5:1, from about 1.15:1 to about 1.4:1, or from about 1.15:1 to about 1.3:1. In yet another embodiment, the ratio of amine molar equivalents to isocyanate molar equivalents can be from 1.2:1 to about 1.7:1, from 1.2:1 to about 1.6:1, from 1.2:1 to about 1.5:1, from 1.2:1 to about 1.4:1, or from 1.2:1 to about 1.3:1.

The molar equivalents ratio of amine molar equivalents to isocyanate molar equivalents is calculated according to the following equation:

$$\text{Molar Equivalents Ratio} = \frac{\text{amine molar equivalents}}{\text{isocyanate molar equivalents}} \quad (1)$$

In the above equation (1), the amine molar equivalents is calculated according to the following equation:

molar equivalents=Σ(polyamine weight/equivalent weight).

Likewise, in the above equation (1), the isocyanate molar equivalents is calculated according to the following equation:

isocyanate molar equivalents=Σ(polyisocyanate weight/equivalent weight).

The equivalent weight is generally calculated by dividing the molecular weight in grams/mole by the number of functional groups per molecules and is in grams/mole. For some molecules, such as triethylenetetramine ("TETA") and 4,4'-diisocyanato-dicyclohexyl methane ("DES W"), the equivalent weight is equal to the molecular weight divided by the number of functional groups per molecule. For example, TETA has a molecular weight of 146.23 g/mole and 4 amine groups. Therefore, the equivalent weight is 36.6 g/mol. This calculation is generally correct, but for some materials, the actual equivalent weight may vary from the calculated equivalent weight. In some components, for example, the biuret-containing adduct (i.e., trimer) of hexamethylene-1,6-diisocyanate, the equivalent weight of the commercially available material differs from the theoretical equivalent weight due to, for example, incomplete reaction. The theoretical equivalent weight of the biuret-containing adduct (i.e., trimer) of hexamethylene-1,6-diisocyanate is 159.5 g/mol. The actual equivalent weight of the trimer of hexamethylene-1,6-diisocyanate ("DES N3200"), the commercially available product, is about 183 g/mol. This actual equivalent weight is used in the calculations above. The actual equivalent weight may be obtained from the manufacturer or by titration with a suitable reactant by methods known in the art. The symbol, $\Sigma$, in the amine molar equivalents calculation means that the amine molar equivalents comprises the sum of amine molar equivalents for all polyamines in the reaction medium. Likewise, the symbol, $\Sigma$, in the isocyanate molar equivalents calculation means that the isocyanate molar equivalents comprises the sum of isocyanate molar equivalents for all polyisocyanates in the reaction medium.

Generally, the microcapsules prepared according to the processes described herein can be characterized as having a mean particle size of at least about 2 at least about 3 or at least about 4 For example, the microcapsules have a mean particle size range of from about 2 µm to about 15 from about 2 µm to about 12 from about 2 µm to about 10 from about 2 µm to about 8 or from about 3 µm to about 15 from about 3 µm to about from about 3 µm to about 8 or from about 4 µm to about 15 from about 4 µm to about 12 from about 4 µm to about 10 from about 4 µm to about 8 or from about 4 µm to about 7 The microcapsules are essentially spherical such that the mean transverse dimension defined by any point on a surface of the microcapsule to a point on the opposite side of the microcapsule is essentially the diameter of the microcapsule. The mean particle size of the microcapsules can be determined by measuring the particle size of a representative sample with a laser light scattering particle size analyzer known to those skilled in the art. One example of a particle size analyzer is a Coulter LS Particle Size Analyzer.

II. Herbicidal Compositions

The present invention is further directed to various herbicidal compositions comprising herbicidal microcapsules described herein. Generally, in herbicidal compositions described herein, the herbicidal microcapsules are dispersed in a liquid medium, preferably aqueous liquid medium (e.g., water), after preparation to form liquid herbicidal compositions.

In various embodiments, the herbicidal compositions are herbicidal concentrate compositions. It has been surprisingly discovered that stable concentrate compositions having a high loading of acetamide herbicide can be prepared using the strategies described herein. Generally, the acetamide herbicide concentration on an active ingredient basis in these herbicidal concentrate compositions is at least about 40 wt. %, at least about 42 wt. %, at least about 45 wt. %, at least about 48 wt. %, at least about 50 wt. %, at least about 55 wt. %, or at least about 60 wt. %. For example, the acetamide herbicide concentration on an active ingredient basis can range from about 40 wt. % to about 60 wt. %, from about 40 wt. % to about 55 wt. %, from about 40 wt. % to about 50 wt. %, from about 40 wt. % to about 48 wt. %, from about 40 wt. % to about 45 wt. %, from about 42 wt. % to about 60 wt. %, from about 42 wt. % to about 55 wt. %, from about 42 wt. % to about 50 wt. %, from about 42 wt. % to about 48 wt. %, from about 45 wt. % to about 60 wt. %, from about 45 wt. % to about 55 wt. %, from about 45 wt. % to about 50 wt. %, from about 45 wt. % to about 48 wt. %, from about 50 wt. % to about 60 wt. %, or from about 50 wt. % to about 55 wt. %.

In addition to a high loading of acetamide herbicide, the concentrate compositions can have a relatively high weight ratio of acetamide herbicide to shell wall (providing for a relatively thinner shell wall). It has been unexpectedly discovered that the various concentrate compositions of the present invention exhibit acceptable crop safety even though the weight ratio of acetamide herbicide to shell wall can be relatively high. Accordingly, in various embodiments, the concentrate compositions have as a weight ratio of acetamide herbicide to shell wall that is at least about 12:1, at least about 13:1, at least about 14:1, at least about 15:1, at least about 16:1, at least about 17:1, at least about 18:1, at least about 19:1, at least about 20:1, at least about 25:1, at least about 30:1, at least about 40:1, or at least about 50:1. For example, the weight ratio of acetamide herbicide to the shell wall can range from about 12:1 to about 50:1, from about 12:1 to about 40:1, from about 12:1 to about 30:1, from about 12:1 to about 25:1, from about 12:1 to about 20:1, from about 14:1 to about 50:1, from about 14:1 to about 40:1, from about 14:1 to about 30:1, from about 14:1 to about 25:1, from about 14:1 to about 20:1, from about 15:1 to about 50:1, from about 15:1 to about 40:1, from about 15:1 to about 30:1, from about 15:1 to about 25:1, from about 15:1 to about 20:1, from about 20:1 to about 50:1, from about 20:1 to about 40:1, from about 20:1 to about 30:1, from about 20:1 to about 25:1, from about 25:1 to about 50:1, from about 25:1 to about 40:1, or from about 25:1 to about 30:1.

According to various embodiments of the present invention, the herbicidal concentrate composition comprises microcapsules dispersed in an aqueous liquid medium, wherein the microcapsules comprises a core material comprising an acetamide herbicide and a shell wall comprising a polyurea encapsulating the core material, and wherein the composition has a high loading of an acetamide herbicide (e.g., an acetamide concentration on an active ingredient basis of at least about 40 wt. %) and an increased weight ratio of acetamide herbicide to shell wall (e.g., at least about 12:1).

As noted, in the herbicidal compositions described herein, the microcapsules are dispersed in a liquid medium, particularly water. However, for various concentrate compositions of the present invention, the concentration of water is reduced as compared to herbicidal concentrates having a lower loading of acetamide herbicide. Accordingly, in various embodiments, the herbicidal concentrate composition has a water concentration that is less than about 25 wt. %, less than about 20 wt. %, less than about 15 wt. %, less than about 10 wt. %, or less than about 5 wt. % water. For example, in some embodiments, the herbicidal concentrate composition can have a water concentration that is from about 5 wt. % to about 25 wt. %, from about 10 wt. % to about 25 wt. %, from about 15 wt. % to about 25 wt. %, from about 5 wt. % to about 20 wt. %, from about 10 wt. % to about 20 wt. %, or from about 15 wt. % to about 20 wt. %.

The herbicidal compositions can be further formulated with various additives (e.g., additives to further optimize its shelf stability). Dispersants, stabilizers, and thickeners are useful to inhibit the agglomeration and settling of the microcapsules. This function is facilitated by the chemical structure of these additives as well as by equalizing the densities of the aqueous and microcapsule phases. Anti-packing agents are useful when the microcapsules are to be redispersed. A pH buffer can be used to maintain the pH of the dispersion within desired ranges.

Low molecular weight dispersants may solubilize microcapsule shell walls, particularly in the early stages of their formation, causing gelling problems. Thus, in some embodiments dispersants having relatively high molecular weights of at least about 1.5 kg/mole, at least about 3 kg/mole, at least about 5 kg/mole, at least about 10 kg/mole, or even at least about 15 kg/mole. In some embodiments, the molecular weight may range from about 3 kg/mole to about 50 kg/mole or from about 5 kg/mole to about 50 kg/mole. Dispersants may also be non-ionic or anionic. An example of a high molecular weight, anionic polymeric dispersant is polymeric naphthalene sulfonate sodium salt, such as INVALON (formerly Irgasol, Huntsman Chemicals). Other useful dispersants and stabilizers include gelatin, casein, ammonium caseinate, polyvinyl alcohol, alkylated polyvinyl pyrrolidone polymers, maleic anhydride-methyl vinyl ether copolymers, styrene-maleic anhydride copolymers, maleic acid-butadiene and diisobutylene copolymers, ethylene oxide-propylene oxide block copolymers, sodium and calcium lignosulfonates, sulfonated naphthalene-formaldehyde condensates, modified starches, and modified cellulosics like hydroxyethyl or hydroxypropyl cellulose, sodium carboxy methyl cellulose, and fumed silica dispersions.

Thickeners are useful in retarding the settling process by increasing the viscosity of the aqueous phase. Shear-thinning thickeners may be preferred, because they act to reduce dispersion viscosity during pumping, which facilitates the economical application and even coverage of the dispersion to an agricultural field using the equipment commonly employed for such purpose. The viscosity of the microcapsule dispersion upon formulation may preferably be at least 100 cps. The viscosity of the microcapsule dispersion may range from about 100 cps to about 400 cps, as tested with a Haake Rotovisco Viscometer and measured at about 10° C. by a spindle rotating at about 45 rpm. More preferably, the viscosity may range from about 100 cps to about 300 cps. A few examples of useful shear-thinning thickeners include water-soluble, guar- or xanthan-based gums (e.g., KELZAN from CPKelco), cellulose ethers (e.g., ETHOCEL from Dow), modified cellulosics and polymers (e.g. Aqualon thickeners from Hercules), and microcrystalline cellulose anti-packing agents.

Adjusting the density of the aqueous phase to approach the mean weight per volume of the microcapsules also slows down the settling process. In addition to their primary purpose, many additives may increase the density of the aqueous phase. Further increase may be achieved by the addition of sodium chloride, glycol, urea, or other salts. The weight to volume ratio of microcapsules of preferred dimensions is approximated by the density of the core material, where the density of the core material is from about 1.05 to about 1.5 g/cm$^3$. Preferably, the density of the aqueous phase is formulated to within about 0.2 g/cm$^3$ of the mean weight to volume ratio of the microcapsules. More preferably, the density of the aqueous phase ranges from about 0.2 g/cm$^3$ less than the mean weight to volume ratio of the microcapsules to about equal to the mean weight to volume ratio of the microcapsules.

In order to enhance shelf stability and prevent gelling of dispersions of microcapsules in the liquid herbicidal compositions, particularly upon storage in high temperature environments, the liquid herbicidal compositions may further include urea or similar structure-breaking agent at a concentration of up to about 20 wt. %, typically about 5 wt. % to about 10 wt. %.

Other useful additives include, for example, biocides or preservatives (e.g., PROXEL, commercially available from Avecia), antifreeze agents (such as glycerin, sorbitol, or urea), and antifoam agents (such as Antifoam SE23 from Wacker Silicones Corp.).

The herbicidal compositions of the present invention can also further comprise a release modulating agent that modulates the release rate of the microencapsulated herbicide. Release modulating agents are described in U.S. Patent Application Publication No. 2016/0192645, which is hereby incorporated by reference herein. In various embodiments, the release modulating agent comprises a polyvalent metal cation. The release modulating agent can be added to a herbicidal composition as a water soluble salt or salt solution (e.g., added to the liquid medium, but not the core material of the microcapsules). In some embodiments, the release modulating agent comprises a polyvalent metal cation. The polyvalent ions can be ions of metals selected the group consisting of magnesium, calcium, aluminum, manganese, iron, copper, zinc, and combinations thereof. In certain embodiments, the polyvalent metal cation comprises $Ca^{2+}$.

The molecular weight of the release modulating agent can be relatively small, being no greater than about 1000 g/mol, no greater than about 750 g/mol, no greater than about 500 g/mol, no greater than about 300 g/mol, or no greater than about 200 g/mol. For example, the molecular weight of the release modulating agent can be from about 50 g/mol to about 1000 g/mol, from about 50 g/mol to about 750 g/mol, from about 50 g/mol to about 500 g/mol, from about 50 g/mol to about 300 g/mol, from about 50 g/mol to about 200 g/mol, from about 100 g/mol to about 1000 g/mol, from about 100 g/mol to about 750 g/mol, from about 100 g/mol to about 500 g/mol, from about 100 g/mol to about 300 g/mol, or from about 100 g/mol to about 200 g/mol.

The release modulating agent can also comprise an organic anion. For example, the release modulating agent can comprise an anion selected from the group consisting of acetate, citrate, carbonate, oxalate and combinations thereof (e.g., calcium acetate). Alternatively, the release modulating agent can comprise an inorganic anion. For example, the release modulating agent can be a salt of a mineral acid such as a halide of salt (e.g., calcium chloride). Also, the release modulating agent can comprise a sulfate anion (e.g., copper sulfate). A mixture of salts can be added to the liquid herbicidal compositions as the release modulating agent. For example, the release modulating agent can comprise a combination of a calcium salt such as calcium chloride or calcium acetate and a copper salt such as copper sulfate.

The ratio of moles of polyvalent metal cation to amine molar equivalents contained in the polyamine component used to form the polyurea shell wall can be from about 0.05:1 to about 10:1, from about 0.05:1 to about 5:1, from about 0.05:1 to about 3:1, from about 0.05:1 to about 2:1, from about 0.05:1 to about 1.75:1, from about 0.05:1 to about 1.5:1, from about 0.05:1 to about 1:1, from about 0.1:1 to about 10:1, from about 0.1:1 to about 5:1, from about 0.1:1 to about 3:1, from about 0.1:1 to about 2:1, from about 0.1:1 to about 1.75:1, from about 0.1:1 to about 1.5:1, from about 0.1:1 to about 1:1, from about 0.2:1 to about 10:1, from about 0.2:1 to about 5:1, from about 0.2:1 to about 3:1, from about 0.2:1 to about 2:1, from about 0.2:1 to about 1.75:1, from about 0.2:1 to about 1.5:1, from about 0.2:1 to about 1:1, from about 0.3:1 to about 10:1, from about 0.3:1 to about 5:1, from about 0.3:1 to about 3:1, from about 0.3:1 to about 2:1, from about 0.3:1 to about 1.75:1, from about 0.3:1 to about 1.5:1, from about 0.3:1 to about 1:1, from about 0.4:1 to about 10:1, from about 0.4:1 to about 5:1, from about 0.4:1 to about 3:1, from about 0.4:1 to about 2:1, from about 0.4:1 to about 1.75:1, from about 0.4:1 to about 1.5:1, from about 0.4:1 to about 1:1, from about 0.5:1 to about 10:1, from about 0.5:1 to about 5:1, from about 0.5:1 to about 3:1, from about 0.5:1 to about 2:1, from about 0.5:1 to about 1.75:1, from about 0.5:1 to about 1.5:1, or from about 0.5:1 to about 1:1.

In various embodiments, the mole ratio of acetamide herbicide to polyvalent metal cation can be from 1:1 to about 100:1, from about 2:1 to about 100:1, from about 2:1 to about 80:1, from about 3:1 to about 80:1, from about 3:1 to about 60:1, from about 3:1 to about 40:1, from about 4:1 to about 100:1, from about 4:1 to about 80:1, from about 4:1 to about 60:1, from about 4:1 to about 40:1, from about 4:1 to about 25:1, from about 5:1 to about 100:1, from about 5:1 to about 80:1, from about 5:1 to about 60:1, from about 5:1 to about 40:1, or from about 5:1 to about 25:1.

In various embodiments where the herbicidal composition is a concentrate composition, the concentration of the release modulating agent can be from about 0.1 wt. % to about 5 wt. %, from about 0.1 wt. % to about 3 wt. %, from about 0.1 wt. % to about 2 wt. %, from about 0.2 wt. % to about 5 wt. %, from about 0.2 wt. % to about 3 wt. %, from about 0.5 wt. % to about 5 wt. %, or about 0.5 wt. % to about 3 wt. %.

Surfactants can optionally be included in the compositions of the present invention. Suitable surfactants are selected from non-ionics, cationics, anionics and mixtures thereof. Examples of surfactants suitable for the practice of the present invention include, but are not limited to: alkoxylated tertiary etheramines (such as TOMAH E-Series surfactants); alkoxylated quaternary etheramine (such as TOMAH Q-Series surfactant); alkoxylated etheramine oxides (such as TOMAH AO-Series surfactant); alkoxylated tertiary amine oxides (such as AROMOX series surfactants); alkoxylated tertiary amine surfactants (such as the ETHOMEEN T and C series surfactants); alkoxylated quaternary amines (such as the ETHOQUAD T and C series surfactants); alkyl sulfates, alkyl ether sulfates and alkyl aryl ether sulfates (such as the WITCOLATE series surfactants); alkyl sulfonates, alkyl ether sulfonates and alkyl aryl ether sulfonates (such as the WITCONATE series surfactants); alkoxylated phosphate esters and diesters (such as the PHOSPHOLAN series surfactants); alkyl polysaccharides (such as the AGRIMUL PG series surfactants); alkoxylated alcohols (such as the BRIJ or HETOXOL series surfactants); and mixtures thereof.

Anti-packing agents facilitate redispersion of microcapsules upon agitation of a composition in which the microcapsules have settled. A microcrystalline cellulose material such as LATTICE from FMC is effective as an anti-packing agent. Other suitable anti-packing agents are, for example, clay, silicon dioxide, insoluble starch particles, and insoluble metal oxides (e.g. aluminum oxide or iron oxide). Anti-packing agents which change the pH of the dispersion are preferably avoided, for at least some embodiments.

Any suitable drift control agent(s) for the practice of the present invention can be used. Some known to those skilled in the art include AdjuTec™ Aura, AdjuTec™ Ola, AG16098®, P Span, Brandt Adjulock, Brandt OnSite, Capsule™, Chem-Trol, Clasp °, Coact XE2, COGNITIVE 1™, CORNBELT® Vaporgard™+DRA, DOUBLEX, Eight Ball, Elicit Elite, Ensure Elite, FS Intention™, FS Intention Advanced™, Imperative™, Impetro II, Intact™, Intact™ Advanced, Kabak™ Ultra, Leeway II™, Lockamba 2.0, Mist Control, OnTarget™, On-Point, Padlock® DRA, PinPoint™, Quintain™, Reign®, SERENITY Cubed, SERENITY Plus, STRIKEZONE® LC, TRAPLINE™ PRO II, TRAVERSE™ D, Veracity™ Elite II, GARDIAN, GARDIAN PLUS, DRI-GARD, and PRO-ONE XL available from Van Diest Supply Co.; COMPADRE, available from Loveland Products, Inc.; BRONC MAX EDT, BRONC PLUS DRY EDT, EDT CONCENTRATE, and IN-PLACE available from Wilbur-Ellis Company; STRIKE ZONE DF available from Helena Chemical Co.; INTACT XTRA available from Precision Laboratories, LLC; and AGRHO DR 2000 and AGRHO DEP 775 available from the Solvay Group. Suitable drift control agents include, for example, guar-based (e.g., containing guar gum or derivatized guar gum) drift control agents. Various drift control products may also contain one or more water conditioning agent in combination with the drift control agent(s).

The herbicidal compositions described herein can further comprise an additive to control or reduce potential herbicide volatility. Under some application conditions, certain herbicides such as auxin herbicides, can vaporize into the surrounding atmosphere and migrate from the application site to adjacent crop plants, such as soybeans and cotton, where contact damage to sensitive plants can occur. For example, as described in U.S. Application Publication No. 2014/0128264 and U.S. Pat. No. 9,743,664, which are incorporated herein by reference, additives to control or reduce potential herbicide volatility include monocarboxylic acids or monocarboxylates thereof (e.g., acetic acid and/or an agriculturally acceptable salt thereof).

"Monocarboxylic acid" refers to a hydrocarbon or substituted hydrocarbon containing only one carboxy functional group (i.e., $R_1$—C(O)OH). The salt of a monocarboxylic acid (i.e., a monocarboxylate) refers to the general structure $R_1$—C(O)OM wherein M is an agriculturally acceptable cation. In various embodiments, the composition comprises at least one salt of a monocarboxylic acid, which in aqueous compositions may be present, in whole or in part, in dissociated form as a monocarboxylate anion and the corresponding cation.

Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl).

In various embodiments, the monocarboxylates have the formula $R^1$—C(O)OM, wherein $R^1$ is substituted or unsubstituted $C_1$-$C_{20}$ alkyl, substituted or unsubstituted $C_2$-$C_{20}$ alkenyl, substituted or unsubstituted aryl (e.g., phenyl, and hydroxyphenyl), and substituted or unsubstituted arylalkyl (e.g., benzyl); and M is an agriculturally acceptable cation. As used herein, the terms "alkyl" and "alkenyl" include branched and unbranched (straight chain) species of these substituents. Alkenyl substituents include at least one carbon-carbon double bond.

In some embodiments, $R^1$ is substituted or unsubstituted $C_1$-$C_5$ alkyl (e.g., methyl, ethyl, n-propyl, isopropyl, and butyl), substituted or unsubstituted $C_2$-$C_5$ alkenyl (e.g., ethenyl, n-propenyl, and isopropenyl), substituted or unsubstituted phenyl, or substituted or unsubstituted aryl($C_1$-$C_4$) alkyl (e.g., substituted or unsubstituted benzyl). In certain embodiments, $R^1$ is $C_1$-$C_5$ alkyl, $C_2$-$C_5$ alkenyl, phenyl, and benzyl. As noted, M is an agriculturally acceptable cation. For example, M can be a monovalent metal cation (e.g., alkali metals cations such as sodium cation, potassium cation, and mixtures thereof).

In particular embodiments, the monocarboxylic acid can be selected from the group consisting of formic acid, acetic acid, propionic acid, benzoic acid, phenylacetic acid, and mixtures thereof. Similarly, the monocarboxylate can be selected from the group consisting of formate salts, acetate salts, propionate salts, benzoate salts, phenylacetate salts, and mixtures thereof. The monocarboxylate salts can include, for example, alkali metal salts selected from sodium, potassium, and mixtures thereof. Preferred monocarboxylate salts include sodium acetate and/or potassium acetate.

The molar ratio of co-herbicide (e.g., auxin herbicide) to the monocarboxylic acid, or monocarboxylate thereof, can be typically from about 1:10 to about 10:1, from about 1:5 to about 5:1, from about 3:1 to about 1:3, or from about 2:1 to about 1:2 (e.g., about 1:1). In various herbicidal concentrate compositions, the concentration of monocarboxylic acid and/or monocarboxylate thereof can be from about 0.25% to about 25%, from about 1% to about 20%, from about 2% to about 15%, from about 2% to about 10%, or from about 5% to about 15% by weight of the concentrate composition.

The herbicidal compositions described herein can further comprise a safener in the liquid medium of the compositions (i.e., unencapsulated). As noted herein, safeners include, for example, furilazole ((RS)-3-(dichloroacetyl)-5-(2-furanyl)-2,2-dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy)acetic acid); cyometrinil ((Z)-cyanomethoxyimino(phenyl)acetonitrile); cyprosulfamide (N-[4-(cyclopropylcarbamoyl)phenylsulfonyl]-o-anisamide); dichlormid (N, N-diallyl-2, 2-dichloroacetamide); dicyclonon ((RS)-1-dichloroacetyl-3,3,8a-trimethylperhydropyrrolo[1,2-a]pyrimidin-6-one); dietholate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)—O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino(phenyl)acetonitrile); isoxadifen (4,5-dihydro-5,5-diphenyl-1,2-oxazole-3-carboxylic acid); cyprosulfamide; salts and esters thereof, and mixtures thereof.

Microencapsulated herbicide compositions are typically complex mixtures containing several functional components in addition to the herbicide and microcapsule polymer such as solvents, dispersants, emulsifying agents, pH adjusting agents, antifreeze agent, defoaming agents, structure-breaking agents, anti-packing agents, surfactants, preservatives, and safeners. However, it has been discovered that one or more of these components can negatively affect the chemical stability of some co-herbicides (i.e., unencapsulated co-herbicides) added to the composition. It has been further discovered that chemical stability can be improved by either removing or substantially reducing the amount of certain additives. Surprisingly, these compositions have been found to retain physical stability. Also, these compositions improve formulation economics by reducing the amount of ingredients required to prepare a storage-stable herbicidal composition.

Chemical stability is evaluated by determining the weight % recovery of the acetamide herbicide and/or any co-herbicide after storage for a period of time at a fixed temperature. For example, in one stability test, the composition is stored at 40° C. for 4 weeks or 8 weeks. In another stability test, the composition is stored at 54° C. for 2 weeks, or 1 week. The herbicide concentrations are measured at the beginning of the storage period and at the end of the storage period. The weight % recovery of the acetamide herbicide and/or any co-herbicide is calculated by dividing the final concentration (e.g., weight % after storage period) of the acetamide herbicide and/or any co-herbicide by the initial concentration (e.g., weight % at start of storage period) of the respective herbicide and multiplying by 100%. The greater the weight % recovery of the herbicide, the greater the chemical stability of the composition. The results may also be presented as the weight % of the herbicide that is lost relative to 100%.

Accordingly, various embodiments of the present invention include herbicidal concentrate compositions comprising herbicidal microcapsules dispersed in an aqueous liquid medium, wherein the herbicidal microcapsules comprises a core material comprising an acetamide herbicide and a shell wall comprising a polyurea encapsulating the core material and wherein the total concentration of unencapsulated additives, excluding water and any co-herbicides, is no more than about 15 wt. %, no more than about 10 wt. %, no more than about 5 wt. %, no more than about 3 wt. %, or no more than about 1 wt. % of the composition. In some embodiments, the total concentration of unencapsulated additives, excluding water and any co-herbicides, is from about 0.1 wt. % to about 15 wt. %, from about 0.1 wt. % to about 10 wt. %, from about 0.1 wt. % to about 5 wt. %, from about 0.1 wt. % to about 3 wt. %, from about 0.1 wt. % to about 1 wt. %, from about 0.5 wt. % to about 15 wt. %, from about 0.5 wt. % to about 10 wt. %, from about 0.5 wt. % to about 5 wt. %, from about 0.5 wt. % to about 3 wt. %, or from about 0.5 wt. % to about 1 wt. % of the composition. In these compositions, the acetamide herbicide concentration can be at least about 40 wt. % or greater as described herein and the weight ratio of acetamide herbicide to shell wall can be at least about 12:1 or greater (e.g., at least about 20:1 or at least about 25:1) also as described herein.

In some embodiments, the core material of herbicidal microcapsules described herein can comprise from about 1 wt. % to about 10 wt. % of a diluent (e.g., water-insoluble organic solvent). However, it has been found that the diluent is one component that can be either removed or the amount of which can be substantially reduced. Accordingly, in certain embodiments, the microcapsules are essentially free of a diluent (e.g., the core material does not contain any diluent or the diluent is less than about 0.5 wt. % or less than about 0.1 wt. % of the core material).

As noted herein, the herbicidal compositions described herein can comprise a dispersant (e.g., a high molecular weight dispersant such as a polymeric naphthalene sulfonate salt). However, it has been found that the dispersant is one component that the amount of which can be substantially reduced. Accordingly, in various embodiments, the composition contains no more than about 5 wt. %, no more than about 3 wt. %, or no more than about 1 wt. % of total dispersant. In some embodiments, the composition contains no more than about 5 wt. %, no more than about 3 wt. %, no more than about 1 wt. %, no more than about 0.5 wt. %, or no more than about 0.1 wt. % of dispersant(s) having a molecular weight of at least about 10 kg/mole, at least about 13 kg/mole, at least about 15 kg/mole, at least about 20 kg/mole, or at least about 25 kg/mole. In certain embodiments, the molecular weight of the dispersant(s) can range from about 13 kg/mole to about 50 kg/mole or from about 15 kg/mole to about 50 kg/mole. In some embodiments, the composition is essentially free of a polymeric naphthalene sulfonate salt (e.g., the composition does not contain any polymeric naphthalene sulfonate salt or the concentration of the polymeric naphthalene sulfonate salt is less than about 0.5 wt. % or less than about 0.1 wt. % of the composition).

In various embodiments, the herbicidal compositions described herein can comprise a structure-breaking agent, such as urea, at a concentration of up to about 20 wt. % (e.g., about 5 wt. % to about 10 wt. %). However, it has been found that structure-breaking agent is another component that the amount of which can be substantially reduced. Accordingly, in some embodiments, the composition contains no more than about 5 wt. %, no more than about 3 wt. %, or no more than about 1 wt. % of structure-breaking agent(s), such as urea. In certain embodiments, the composition is essentially free of urea (e.g., the composition does not contain any urea or the concentration of urea is less than about 0.5 wt. % or less than about 0.1 wt. %. of the composition).

As noted, in the herbicidal compositions described herein, the microcapsules are dispersed in a liquid medium, particularly water. In the concentrate compositions described herein as containing fewer components and/or reduced concentrations of components, the water concentration can be greater as compared to other herbicidal concentrate composition. Accordingly, various concentrate compositions can have a water concentration that is at least about 30 wt. %, at least about 35 wt. %, or at least about 40 wt. %. In some embodiments, these herbicidal concentrate compositions can have a water concentration that is from about 30 wt. % to about 50 wt. %, from about 30 wt. % to about 45 wt. %, from about 30 wt. % to about 40 wt. %, from about 35 wt. % to about 50 wt. %, from about 35 wt. % to about 45 wt. %, from about 35 wt. % to about 40 wt. %, from about 40 wt. % to about 50 wt. %, or from about 40 wt. % to about 45 wt. %.

In the concentrate compositions described herein as containing fewer components and/or reduced concentrations of components, it has been observed that the readily extractable acetamide herbicide in the aqueous phase of the concentrate compositions is reduced as compared to conventional microencapsulated formulations. In various embodiments, the readily extractable acetamide herbicide in the aqueous phase of the concentrate compositions can be no more than about 0.15%, no more than about 0.12%, no more than about 0.1%, or no more than about 0.08% by weight of the total acetamide herbicide. In some embodiments, the readily extractable acetamide herbicide in the aqueous phase of the concentrate compositions is from about 0.01% to about 0.15%, from about 0.02% to about 0.15%, from about 0.03% to about 0.15%, from about 0.04% to about 0.15%, from about 0.01% to about 0.12%, from about 0.02% to about 0.12%, from about 0.03% to about 0.12%, from about 0.04% to about 0.12%, from about 0.01% to about 0.1%, from about 0.02% to about 0.1%, from about 0.03% to about 0.1%, or from about 0.04% to about 0.1% by weight of the total acetamide herbicide. Readily extractable acetamide herbicide can be determined by extracting the concentrate composition with weak solvent such as an aliphatic hydrocarbon solvent and analyzing the extract.

Co-Herbicides

The herbicidal compositions of the present invention can further comprise one or more co-herbicides (i.e., in addition to the microencapsulated acetamide herbicide). Generally, the co-herbicide is added to the liquid medium comprising the herbicidal microcapsules dispersed therein. Although, in some embodiments, certain co-herbicides may be suitable for co-encapsulation with the acetamide herbicide.

In various embodiments, the weight ratio of total microencapsulated herbicide to co-herbicide can be from about 1:30 to about 30:1, from about 1:20 to about 20:1, from about 1:10 to about 10:1, from about 1:8 to about 8:1, from about 1:5 to about 5:1, from about 1:1 to about 30:1, from about 1:1 to about 20:1, from about 1:1 to about 10:1, from about 1:1 to about 8:1, from about 1:1 to about 5:1, from about 1:1 to about 3:1, from about 2:1 to about 30:1, from about 2:1 to about 20:1, from about 2:1 to about 10:1, from about 2:1 to about 8:1, from about 2:1 to about 5:1, from about 2:1 to about 3:1, from about 1:1.5 to about 30:1, from about 1:1.5 to about 20:1, from about 1:1.5 to about 15:1, from about 1:1.5 to about 10:1, from about 1:1.5 to about 8:1, from about 1:1.5 to about 5:1, or from about 1:1.5 to about 3:1.

Co-herbicides can be water-soluble and are typically be selected from the group consisting of acetyl CoA carboxylase (ACCase) inhibitors, enolpyruvyl shikimate-3-phosphate synthase (EPSPS) inhibitors, glutamine synthetase inhibitors, auxins, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, hydroxyphenylpyruvate dioxygenase (HPPD) inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof. Examples of herbicides within these classes are provided below. Where an herbicide is referenced generically herein by name, unless otherwise restricted, that herbicide includes all commercially available forms known in the art such as salts, esters, free acids and free bases, as well as stereoisomers thereof. For example, where the herbicide name "glyphosate" is used, glyphosate acid, salts and esters are within the scope thereof.

In various embodiments, the co-herbicide comprises an EPSPS herbicide such as glyphosate or a salt or ester thereof.

In further embodiments, the co-herbicide comprises a glutamine synthetase herbicide including glufosinate or glufosinate-P, or a salt or and ester thereof.

In some embodiments, the co-herbicide comprises an auxin herbicide. Auxin herbicides (i.e., synthetic auxin herbicides) include, for example, 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; butyl 4-amino-3-chloro-5-fluoro-6-(7-fluoro-1H-indol-6-yl)pyridine-2-carboxylate; and salts and esters thereof; and mixtures thereof.

In still further embodiments, the co-herbicide comprises a PPO inhibitor. PPO inhibitors include, for example, ethyl 2-((3-(2-chloro-4-fluoro-5-(3-methyl-2,6-dioxo-4-(trifluoromethyl)-3,6-dihydropyrimidin-1(2H)-yl)phenoxy)pyridin-2-yl)oxy)acetate (S3100), acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof. In particular embodiments, the co-herbicide comprises fomesafen and/or a salt of fomesafen such as sodium fomesafen.

In various embodiments, the co-herbicide comprises a HPPD inhibitor. HPPD inhibitors include, for example, aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, tolpyralate, topramezone and tefuryltrione salts and esters thereof, and mixtures thereof.

In other embodiments, the co-herbicide comprises a PS II inhibitor. PS II inhibitors include, for example, ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

In certain embodiments, the co-herbicide comprises an ACCase inhibitor. ACCase inhibitors include, for example, alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof. ACCase inhibitors also include mixtures of one or more "dims" and one or more "fops", salts and esters thereof.

In various embodiments, the co-herbicide comprises an ALS or AHAS inhibitor. ALS and AHAS inhibitors include, for example, amidosulfuron, azimsulfruon, bensulfuronmethyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuronmethyl, imazamethabenz, imazamox, imazapic, imazapyr, imazaquin, imazethapyr, imazosulfuron, iodosulfuron, metsulfuron-methyl, nicosulfuron, penoxsulam, primisulfuronmethyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuron-methyl, salts and esters thereof, and mixtures thereof.

In further embodiments, the co-herbicide comprises a mitosis inhibitor. Mitosis inhibitors include anilofos, benefin, DCPA, dithiopyr, ethalfluralin, flufenacet, mefenacet, oryzalin, pendimethalin, thiazopyr and trifluralin, salts and esters thereof, and mixtures thereof.

In some embodiments, the co-herbicide comprises a PS I inhibitor such as diquat and paraquat, salts and esters thereof, and mixtures thereof.

In other embodiments, the co-herbicide comprises a cellulose inhibitor such as dichlobenil and isoxaben.

In still further embodiments, the co-herbicide comprises an oxidative phosphorylation uncoupler such as dinoterb, and esters thereof.

In other embodiments, the co-herbicide comprises an auxin transport inhibitor such as diflufenzopyr and naptalam, salts and esters thereof, and mixtures thereof.

In various embodiments, the co-herbicide comprises a dihydropteroate synthase inhibitor such as asulam and salts thereof.

In some embodiments, the co-herbicide comprises a fatty acid and lipid biosynthesis inhibitor such as bensulide, butylate, cycloate, EPTC, esprocarb, molinate, pebulate, prosulfocarb, thiobencarb, triallate and vernolate, salts and esters thereof, and mixtures thereof.

Some preferred co-herbicides flumioxazin, fluometuron, diuron, sulfentrazone, fomesafen, saflufenacil, thiencarbazone, mesotrione, atrazine, isoxaflutole, 2,4-D, dicamba and glyphosate, salts and esters thereof, racemic mixtures and resolved isomers thereof, and mixtures thereof.

The co-herbicide can include a combination of herbicides described above. For example, one combination of co-herbicides is a salt of dicamba and a salt of glyphosate.

In certain embodiments, the co-herbicide comprises a salt of 2,4-D (e.g., an alkali metal salt or amine-based salt such as dimethylamine). In various embodiments, the co-herbicide comprises a salt of dicamba. Specific examples of salts of dicamba include the sodium salt of dicamba, the potassium salt of dicamba, the monoethanolamine salt of dicamba, the diglycolamine salt of dicamba, the dimethylamine salt of dicamba and combinations thereof.

Other agronomically acceptable salts of auxin herbicides such as 2,4-D and dicamba include polyamine salts such as those described in U.S. Patent Application Publication No. 2012/0184434, which is incorporated herein by reference. The polyamines described in U.S. 2012/0184434 include those of formula (A)

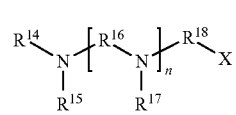

(A)

wherein $R^{14}$, $R^{15}$, $R^{17}$, $R^{19}$ and $R^{20}$ are independently H or $C_1$-$C_6$-alkyl, which is optionally substituted with OH, $R^{16}$ and $R^{18}$ are independently $C_2$-$C_4$-alkylene, X is OH or $NR^{19}R^{20}$, and n is from 1 to 20; and those of formula (B)

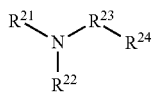

(B)

wherein $R^{21}$ and $R^{22}$ are independently H or $C_1$-$C_6$-alkyl, $R^{23}$ is $C_1$-$C_{12}$-alkylene, and $R^{24}$ is an aliphatic $C_5$-$C_8$ ring system, which comprises either nitrogen in the ring or which is substituted with at least one unit $NR^{21}R^{22}$. Specific examples of these polyamines include tetraethylenepentamine, triethylenetetramine, diethylenetriamine, pentamethyldiethylenetriamine, N,N,N',N'',N''-pentamethyl-dipropylenetriamine, N,N-bis(3-dimethylaminopropyl)-N-isopropanolamine, N'-(3-(dimethylamino)propyl)-N,N-dimethyl-1,3-propanediamine, N,N-bis(3-aminopropyl) methylamine, N-(3-dimethylaminopropyl)-N,N-diisopropanolamine, N,N, N'-trimethylaminoethyl-ethanolamine, aminopropylmonomethylethanolamine, and aminoethylethanolamine, and mixtures thereof.

One preferred aqueous herbicidal composition comprises herbicidal microcapsules as described herein dispersed in an aqueous liquid medium. The herbicidal microcapsules comprise a core material comprising acetochlor as the acetamide herbicide and a shell wall encapsulating the core material, wherein the shell wall comprises a polyurea. The aqueous liquid medium of this composition also comprises a salt of dicamba as the co-herbicide.

In various concentrate compositions, the total co-herbicide concentration is from about 1 wt. % to about 20 wt. %, from about 2 wt. % to about 20 wt. %, from about 5 wt. % to about 20 wt. %, from about 1 wt. % to about 15 wt. %, from about 2 wt. % to about 15 wt. %, from about 5 wt. % to about 15 wt. %, from about 1 wt. % to about 10 wt. %, from about 2 wt. % to about 10 wt. %, or from about 5 wt. % to about 10 wt. %.

In other embodiments, the herbicidal compositions are application mixtures. The total herbicide loading in the application mixture is typically no more than about 5% by weight or from about 0.1% to about 5% by weight on an active ingredient basis, such as 5%, 4%, 3%, 2%, 1%, 0.5% or 0.1% by weight on an active ingredient basis. The application mixture can be prepared from the herbicidal compositions as described herein (e.g., by diluting an aqueous herbicidal concentrate composition comprising the herbicidal microcapsules with water). Co-herbicides and other additives, including those mentioned herein, can be added to the application mixture before or after dilution of the herbicidal concentrate compositions.

III. Methods of Use

The present invention is also directed to various methods of using the herbicidal microcapsules and the herbicidal compositions comprising the herbicidal microcapsules as described herein. Various methods are directed to controlling weeds in a field comprising applying to the field an application mixture comprising the herbicidal microcapsules.

The application mixture may be applied to a field according to practices known to those skilled in the art and are preferably applied to an agricultural field within a selected timeframe of crop plant development. In various embodiments, the application mixture is applied to the soil, before planting the crop plants or after planting, but pre-emergence to the crop plants. In these and other embodiments, the application mixture is applied to a field from 1-40 days prior to planting of the crop plant and/or pre-emergence (i.e., from planting of the crop plant up to, but not including, emergence or cracking) in order to provide control of newly emerging monocots and small seeded dicot species. In other embodiments of the present invention, the application mixture is applied post-emergence to the crop plants. In various embodiments, the application mixture is applied pre-emergence to the weeds. In other embodiments, the application mixture is applied post-emergence to the weeds.

As used herein, "prior to planting of the crop plant" refers, for example, to a time period of from about 40 days prior to planting of the crop plant to immediately before planting of the crop plant, from about 35 days prior to planting of the crop plant to immediately before planting of the crop plant, from about 30 days prior to planting of the crop plant to immediately before planting of the crop plant, from about 25 days prior to planting of the crop plant to immediately before planting of the crop plant, from about 20 days prior to planting of the crop plant to immediately before planting of the crop plant, from about 15 days prior to planting of the crop plant to immediately before planting of the crop plant, from about 10 days prior to planting of the crop plant to immediately before planting of the crop plant, or from about 5 days prior to planting of the crop plant to immediately before planting of the crop plant. For purposes of the present invention, post-emergence to crop plants includes initial emergence from the soil, i.e., "at cracking."

In various embodiments, the application mixture further comprises one or more co-herbicides. The application mixture comprising the herbicidal microcapsules can be tank mixed with one or more co-herbicides. The co-herbicide(s) can be introduced at various stages. For example, the co-herbicide(s) can be mixed with the aqueous herbicidal composition or dilution thereof and/or the application mixture. The co-herbicide can include, among others, any co-herbicide as mentioned herein (e.g., glyphosate and/or dicamba or salts thereof).

The effective amount (use rate) of encapsulated acetamide herbicide and any optional co-herbicide to be applied to an agricultural field is dependent upon the identity of the herbicides, the release rate of the microcapsules, the crop to be treated, and environmental conditions, especially soil type and moisture. Generally, use rates of acetamide herbicides, such as acetochlor, are on the order of at least about 100 g/ha (grams of active ingredient per hectare), at least about 250 g/ha, at least about 500 g/ha, or at least about 1000 g/ha. For example, the use rate of acetamide herbicides can ranges from about 100 g/ha (grams active ingredient per hectare) to about 5000 g/ha, from about 250 g/ha to about 5000 g/ha, from about 500 g/ha to about 5000 g/ha, or from about 1000 g/ha to about 5000 g/ha. From about 100 g/ha to about 3000 g/ha, from about 250 g/ha to about 3000 g/ha, from about 500 g/ha to about 3000 g/ha, or from about 1000 g/ha to about 3000 g/ha. From about 100 g/ha to about 2000 g/ha, from about 250 g/ha to about 2000 g/ha, from about 500 g/ha to about 2000 g/ha, from about 1000 g/ha to about 2000 g/ha, or from about 1200 g/ha to about 2000 g/ha.

Generally, use rates of co-herbicides, such as dicamba, are on the order of at least about 50 g/ha (grams acid equivalent per hectare), at least about 100 g/ha, at least about 250 g/ha, at least about 500 g/ha, at least about 1000 g/ha, at least about 1500 g/ha, at least about 2000 g/ha, at least about 2500 g/ha, or at least about 3000 g/ha. For example, from about 100 g/ha to about 5000 g/ha, from about 500 g/ha to about 2500 g/ha, or from about 500 g/ha to about 2000 g/ha. From about 100 g/ha to about 1000 g/ha, from about 250 g/ha to about 1000 g/ha, or from about 250 g/ha to about 900 g/ha. As used herein, the term "acid equivalent" or "a.e." refers to the amount of herbicide present without taking into account the weight of the counter-ion of the salt species if present.

Application mixtures are useful for controlling a wide variety of weeds, i.e., plants that are considered to be a nuisance or a competitor of commercially important crop plants, such as corn, soybean, wheat, barley, cotton, dry beans, snap beans, and potatoes etc. Examples of weeds that may be controlled according to the method of the present invention include, but are not limited to, Velvetleaf (*Abutilon theophrasti*), Proso Millet (*Panicum miliaceum*), Waterhemp (*Amaranthus tuberculatus*); Redroot Pigweed (*Amaranthus retroflexus*) and other weed species within the *Amaranthus* genus; Green Foxtail (*Setaria viridis*), *Setaria lutescens* and other *Setaria* spp., Morning Glory (*Ipomoea* spp.), Goosegrass (*Eleusine indica*); Meadow Foxtail (*Alopecurus pratensis*) and other weed species with the *Alopecurus* genus, Common Barnyard Grass (*Echinochloa crusgalli*) and other weed species within the *Echinochloa* genus, crabgrasses within the genus *Digitaria*, White Clover (*Trifolium repens*), Lambsquarters (*Chenopodium berlandieri*), Common Purslane (*Portulaca oleracea*) and other weed species in the *Portulaca* genus, *Chenopodium album* and other *Chenopodium* spp., *Sesbania exaltata* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., and *Conyza Canadensis* and other *Conyza* spp.

In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of *Amaranthus palmeri*, *Amaranthus rudis*, *Ambrosia artemisiifolia*, *Ambrosia trifida*, *Conyza bonariensis*, *Conyza canadensis*, *Digitaria insularis*, *Echinochloa colona*, *Eleusine indica*, *Euphorbia heterophylla*, *Lolium multiflorum*, *Lolium rigidum*, *Plantago lancelata*, *Sorghum halepense*, and *Urochloa panicoides*.

In some embodiments of the present invention, crop plants include, for example, corn, soybeans, cotton, wheat, dry beans, snap beans, and potatoes. Particularly preferred crop species are corn, soybeans, cotton, wheat, and barley. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), *Bacillus thuringiensis* (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides, In other embodiments the crop plants are tolerant to glyphosate, dicamba, 2,4-D, MCPA, quizalofop, glufosinate, metribuzin and/or diclofop-methyl. In other embodiments, the crop plant is glyphosate and/or dicamba tolerant. In some embodiments of the present invention, crop plants are glyphosate and/or glufosinate tolerant. In further embodiments, the crop plants are glyphosate, glufosinate and dicamba tolerant. In these and other embodiments, the crop plants are tolerant to PPO inhibitors. In certain embodiments, the crop plants are tolerant to metribuzin.

The methods of the present invention can also provide for improved residual weed control. As noted, the release properties of microencapsulated acetamide herbicides can be particularly sensitive to additives in the core material of the microcapsules. However, microencapsulated acetamide herbicides of the present invention can provide commercially acceptable rate of weed control for at least 28 days, at least 35 days, at least 42 days, or more.

Various methods for improving residual weed control comprise applying to a field an application mixture comprising the herbicidal microcapsules as described herein. In some embodiments, the herbicidal microcapsule comprises a core material comprising an acetamide herbicide and a shell wall encapsulating the core material, wherein the shell wall comprises a polyurea. In further embodiments, the application mixture also comprises a salt of dicamba (e.g., sodium or diglycolamine salt of dicamba). Application mixtures comprising microencapsulated acetamide herbicides and a salt dicamba can provide for improved residual weed control, especially for broadleaf weed control. In some embodiments, a commercially acceptable rate of weed control of at least about 90%, at least about 92%, or at least about 95% can be achieved at about 28 days after treatment (DAT). In these and other embodiments, a commercially acceptable rate of weed control of at least about 85%, at least about 87%, or at least about 90%, at least about 92% can be achieved at about 42 days after treatment (DAT). In various embodiments, these rates of weed control can be achieved for broadleaf weeds selected from the group consisting of Velvetleaf (*Abutilon theophrasti*), Common Waterhemp (*Amaranthus rudis*), Tall Waterhemp (*Amaranthus tuberculatus*), Redroot Pigweed (*Amaranthus retroflexus*) and other weed species within the *Amaranthus* genus, Common Purslane (*Portulaca oleracea*) and other weed species in the *Portulaca* genus, Morning Glory (*Ipomoea* spp.), *Sesbania exaltata* spp., Venice Mallow (*Hibiscus trionum*), Prickly sida (*Sida spinosa*), *Mollugo verticillata*, *Desmodium* spp., and combinations thereof.

In these and other embodiments, the acetamide herbicide is applied at a use rate of from about 100 g/ha (grams active ingredient hectare) to about 5000 g/ha, from about 250 g/ha to about 5000 g/ha, from about 500 g/ha to about 5000 g/ha, or from about 1000 g/ha to about 5000 g/ha. From about 100 g/ha to about 3000 g/ha, from about 250 g/ha to about 3000 g/ha, from about 500 g/ha to about 3000 g/ha, or from about 1000 g/ha to about 3000 g/ha. From about 100 g/ha to about 2000 g/ha, from about 250 g/ha to about 2000 g/ha, from about 500 g/ha to about 2000 g/ha, from about 1000 g/ha to about 3000 g/ha, or from about 1000 g/ha to about 2000 g/ha. Also, the salt of dicamba can be applied at a use rate is from about 100 g/ha (grams acid equivalent per hectare) to about 1000 g/ha, from about 250 g/ha to about 1000 g/ha, or from about 250 g/ha to about 900 g/ha.

A "commercially acceptable rate of weed control" varies with the weed species, degree of infestation, environmental conditions, and the associated crop plant. Typically, commercially effective weed control is defined as the destruction (or inhibition) of at least about 60%, 65%, 70%, 75%, 80%, or even at least 85%, or even at least 90%. Although it is generally preferable from a commercial viewpoint that 80-85% or more of the weeds be destroyed, commercially acceptable weed control can occur at much lower destruction or inhibition levels, particularly with some very noxious, herbicide-resistant plants.

The herbicidal microcapsules of the present invention can also provide for improved crop safety. A "commercially acceptable rate of crop injury" varies with the crop plant species. Typically, a commercially acceptable rate of crop injury is defined as less than about 20%, 15%, 10% or even less than about 5% injury. In various embodiments, the herbicidal microcapsules and methods of the present invention limit crop injury to a commercially acceptable rate as measured from about 24 hours (about 1 Day After Treatment or DAT) to two weeks (about 14 DAT), from about 24 hours (about 1 DAT) to three weeks (about 21 DAT), or from about 24 hours (about 1 DAT) to about four weeks (about 28 DAT).

Rates of weed control and crop injury are determined as a percentage as compared to untreated plants following a standard procedure where visual assessment of plant mortality and growth reduction is made by one specially trained to make such assessments.

Although various methods discussed herein reference applying an application mixture to "a field of crop plants," it is understood that these methods can include applying the mixture to fields that are to be planted with crop plants (e.g., for pre-plant application or burndown in fallow fields). Further, even though various methods reference weeds in a "field," this term is inclusive of smaller, discrete areas, such as a pot of soil or raised bed (e.g., in a greenhouse setting).

Having described the invention in detail, it will be apparent that modifications and variations are possible without departing from the scope of the invention defined in the appended claims.

EXAMPLES

The following non-limiting examples are provided to further illustrate the present invention.

Example 1: High Load Microencapsulated Acetochlor Compositions

A series of dispersions of high load microencapsulated acetochlor compositions were prepared according to the following general procedure. The acetochlor content of the microcapsules is provided in Table 1.

The process of microencapsulation is conducted using an interfacial polycondensation technique. Generally, this technique involves preparing an oil or discontinuous phase liquid containing the herbicide to be encapsulated, the first reactive monomeric/polymeric material(s) (e.g., polyisocyanate), and any additional components to be encapsulated, such as diluents or safeners. In this example, the discontinuous phase liquid was prepared with the acetamide herbicide acetochlor and the components listed below in Table 1. The compositions were prepared having the concentrations set forth below.

The acetochlor was charged to a mixing vessel. Next, the diluent, ISOPAR M, was charged to the mixing vessel, followed by the polyisocyanate. The solution was agitated to and heated to 50° C. to obtain a homogenous solution.

The interfacial polycondensation technique also requires preparation of an aqueous or continuous phase liquid containing, among other components, the second reactive monomeric or polymeric material (e.g., polyamine). The continuous phase was prepared with the components listed below in Table 1. A mixing vessel was charged with water and the remaining external phase components except for TETA. The solution was agitated to obtain a clear homogenous solution. The solution may be sealed within the mixing vessel and stored until needed. Prior to use, the mixture was heated to 50° C. in an oven and covered to avoid evaporation.

Following preparation of the discontinuous phase and the continuous phase liquids, an interfacial polymerization medium was prepared by first charging the continuous phase liquid (without the polyamine TETA) to a Waring blender cup that has been preheated to 45° C. The commercial Waring blender (Waring Products Division, Dynamics Corporation of America, New Hartford, Conn., Blender 700) was powered through a 0 to 120 volt variable autotransformer. The blender mix speed was varied by controlling power to the blender. The discontinuous phase liquid was then added to the continuous phase liquid over a brief interval and blended for 4 minutes to obtain an emulsion.

To initiate polymerization of the polyisocyanate (formation of the polyurea shell wall) and encapsulation of the discontinuous phase liquid, TETA (the polyamine) was added to the emulsion and blended for about 45 seconds. The emulsion was then transferred to a hot bath at about 41° C. and stirred for approximately 1.5 hours, which has been found is sufficient time for the isocyanate to react essentially completely.

The microcapsule slurry was then mixed with a stabilizer having the ingredients listed below in Table 1 to form an aqueous dispersion of the microcapsules. The components shown in Table 1 are previously premixed with a high speed mixer (Waring Blender or Cowles Dissolver). The resulting stabilizer premix is then added to the microcapsule slurry to stabilize the dispersion of microcapsules and stirred at a speed which just produces a vortex and until the dispersion is visually homogeneous. The mixture is then cooled in a water bath to close to room temperature.

TABLE 1

| Component | Component Conc. (wt. %) | 43.5 wt. % A.I. | 45 wt. % A.I. | 48 wt. % A.I. | 50 wt. % A.I. |
|---|---|---|---|---|---|
| | | Concentration in Final Composition (wt. %) | | | |
| Discontinuous Phase | | | | | |
| Acetochlor | 96.10 | 45.52 | 46.80 | 49.95 | 52.03 |
| ISOPAR M (solvent, $C_{11}$-$C_{16}$ isoalkanes) | 100 | 0.40 | 2.50 | 2.50 | 2.50 |
| DESMODUR N3215: Blend of DESMODUR N3200 and DESMODUR W (85% by weight trimer of hexamethylene-1,6-diisocyanate: 15% by weight 4,4'-diisocyanato-dicyclohexyl methane) | 100 | 2.31 | 2.51 | 2.51 | 2.51 |
| Continuous Phase | | | | | |
| Glycerin | 100 | 8.50 | 2.50 | 2.00 | 2.00 |
| Sokalan CP9 | 25 | 2.90 | 2.90 | 2.90 | 3.80 |
| Ammonium Caseinate | 100 | — | 0.06 | 0.06 | 0.06 |
| Citric Acid | 50 | 0.34 | 0.21 | 0.21 | 0.21 |
| Water | 100 | 20.08 | 20.77 | 20.50 | 17.32 |
| Triethylenetetramine (TETA) | 50 | 1.122 | 1.273 | 1.273 | 1.273 |
| Stabilizer | | | | | |
| Invalon DAM (naphthalene sulfonate condensate) | 40 | 8.60 | 8.20 | 7.80 | 8.00 |
| Kelzan CC (xanthan gum) | 100 | 0.060 | 0.040 | 0.030 | 0.020 |
| Agnique DFM-111S (silicone based defoamer) | 100 | 0.001 | 0.001 | 0.001 | 0.001 |

TABLE 1-continued

| Component | Component Conc. (wt. %) | 43.5 wt. % A.I. | 45 wt. % A.I. | 48 wt. % A.I. | 50 wt. % A.I. |
|---|---|---|---|---|---|
| | | Concentration in Final Composition (wt. %) | | | |
| Proxel GXL (solution of 1,2-benzisothiazolin-3-one) | 20 | 0.080 | 0.068 | 0.068 | 0.068 |
| Caustic (NaOH) | 20 | 0.021 | 0.021 | 0.021 | 0.021 |
| Di sodium Phosphate | 100 | 0.070 | 0.150 | 0.150 | 0.150 |
| Urea | 50 | 10.00 | 10.00 | 10.00 | 10.00 |
| Propylene Glycol | 100 | — | 2.000 | — | — |

Example 2: Weed Efficacy of High Load Microencapsulated Acetochlor Compositions Greenhouse tests were conducted to evaluate pre-emergence weed control on waterhemp (AMATA), green foxtail (SETVI), and proso millet (PANMI). Application mixtures were prepared from selected concentrate compositions prepared in accordance with Example 1.

The weed seeds were planted in 3.5-inch square plastic pots filled with a potting media of 50% silt loam soil and 50% Redi-earth (Sun Gro, Bellevue, Wash.) with 100 g/cu-ft Osmocote 14-14-14 slow release fertilizer. Growth conditions were 27° C. day and 21° C. night with 16 hours of supplemental light (approximately 600 microeinsteins). The pots are placed in an environment equipped with sub-irrigation. Overhead irrigation water was also applied as needed to maintain soil moisture. Application mixtures containing the microcapsules were applied to the plants with a track sprayer generally using a Teejet 9501E spray nozzle or similar nozzle with air pressure set at a minimum of 165 kPa. The spray nozzle was 16 inches above the top of the plants and a spray volume rate of about 94 L per hectare was applied.

Table 2 presents the results at 18 days after treatment on waterhemp and green foxtail. At the 1260 g a.i./ha rate on waterhemp, most compositions provided for >97% control. At the 2520 g a.i./ha rate, control was >98% across all compositions for the control of waterhemp. At the 1260 g a.i./ha rate on green foxtail, all compositions provided at least 90% control, except 10034096-1 which provided nearly 90% control, except 10034096-2 which provided 77.5% control. The latter was due to two replications which had 40% and 50% control. At the 2520 g a.i./ha rate, all compositions provided >90% control of green foxtail.

Table 3 present results weed control for waterhemp and proso millet at 0, 7, 14, 21, 28 and 35 days. Residual efficacy was compared to WARRANT, a microencapsulated acetochlor product available from Monsanto Company.

TABLE 2

Summary of Pre-Emergence Efficacy

| Composition | Acetochlor Concentration in Concentrate Composition (wt. %) | Acetochlor Use Rate g a.i./ha | Waterhemp (AMATA) % control (18 DAT) | Green Foxtail (SETVI) % control (18 DAT) |
|---|---|---|---|---|
| 10034094-0 | 33 | 1260 | 88.8 | 96.0 |
| 10034094-0 | 33 | 2520 | 99.7 | 98.0 |
| 10034094-1 | 42 | 1260 | 99.2 | 99.7 |
| 10034094-1 | 42 | 2520 | 100.0 | 99.8 |
| 10034096-1 | 42 | 1260 | 99.3 | 89.7 |
| 10034096-1 | 42 | 2520 | 99.2 | 95.8 |
| 10034096-2 | 42 | 1260 | 97.3 | 77.5 |
| 10034096-2 | 42 | 2520 | 100.0 | 100.0 |
| 10034095-1 | 42 | 1260 | 90.5 | 91.5 |
| 10034095-1 | 42 | 2520 | 100.0 | 98.3 |
| 10034095-2 | 42 | 1260 | 98.8 | 92.7 |
| 10034095-2 | 42 | 2520 | 98.8 | 96.0 |
| 10034099-1 | 45 | 1260 | 99.5 | 97.0 |
| 10034099-1 | 45 | 2520 | 100.0 | 99.5 |
| 10034099-2 | 45 | 1260 | 99.8 | 98.0 |
| 10034099-2 | 45 | 2520 | 100.0 | 96.5 |
| 10034097-1 | 45 | 1260 | 99.0 | 94.7 |
| 10034097-1 | 45 | 2520 | 99.8 | 91.7 |
| 10034097-2 | 45 | 1260 | 98.8 | 98.5 |
| 10034097-2 | 45 | 2520 | 100.0 | 98.8 |
| 10034098-1 | 45 | 1260 | 99.8 | 97.5 |
| 10034098-1 | 45 | 2520 | 100.0 | 99.8 |
| 10034098-2 | 45 | 1260 | 100.0 | 98.3 |
| 10034098-2 | 45 | 2520 | 100.0 | 98.3 |

TABLE 3

Residual Efficacy for Control of Waterhemp and Proso Millet

| Composition | Acetochlor Concentration in Concentrate Composition (wt. %) | 0 days | 7 days | 14 days | 21 days | 28 days | 35 days |
|---|---|---|---|---|---|---|---|
| | | % Control of Waterhemp | | | | | |
| 1 | 43.5 | 98.9 | 97.8 | 100.0 | 99.4 | 100.0 | 100.0 |
| 2 | 43.5 | 98.9 | 100.0 | 100.0 | 100.0 | 100.0 | 100.0 |
| WARRANT | 33 | 88.9 | 86.1 | 94.4 | 95.9 | 98.3 | 99.4 |
| | | % Control of Proso Millet | | | | | |
| 1 | 43.5 | 67.8 | 73.9 | 85.0 | 89.2 | 100.0 | 100.0 |
| 2 | 43.5 | 95.0 | 90.0 | 94.6 | 93.9 | 100.0 | 100.0 |
| WARRANT | 33 | 0.0 | 0.0 | 39.4 | 53.3 | 98.9 | 92.0 |

Example 4: Weed Control in the Field

Field experiments were conducted at various field locations. A group unbalanced block (GUBD) design with four replications was used in all the trials. Field preparation consisted of a fall disking followed by a spring disking and two passes in opposite directions with a two-way bed conditioner equipped with rolling baskets and S-tine harrows set to operate 6 cm deep. Weed seeds were either naturally present in the seed bank or were planted to plots measuring 3.3 by 6 m. Application mixtures prepared from selected concentrate compositions prepared in accordance with Example 1 were applied using a $CO_2$ pressurized backpack sprayer fitted with Teej et TTI110015 nozzles calibrated to deliver 140 l/ha. The spray nozzle was 50 cm above the top of the target surface. In all trials, visual weed control or growth inhibition ratings were recorded at 14, 21 and 28 days after treatment (DAT) for each weed species on a 0 to 100% scale where 0=no control or growth inhibition and 100=plant death. Data was analyzed across different weed species with in each weed group i.e. broadleaf weeds and grasses using MIXED procedure of SAS (SAS 2003). Trials and replications within trial were considered random effects and herbicide treatments were considered fixed effects. Type III statistics were used to test significance of fixed effects. Equivalence test with a lower equivalence bound of −10 and alpha level of 0.1 was used to compare new formulations to the commercial formulation. Least square means were used and mean separation was carried out using Fischer's protected LSD at $\alpha$=0.1 to further compare new formulations to each other. The results of the field trials are presented in Table 4.

Weed control at 14 and 21 DAT was very high (>90%) and decreased to 80-90% at 28 DAT and provided better probability of differentiating the various treatments based on the statistical tests. At 28 DAT, all the new formulations of microencapsulated acetochlor provided weed control equivalent to WARRANT. No difference was observed between the new formulations.

TABLE 4

Pre-Emergence Grass and Broadleaf Weed Control

| Composition | Acetochlor Concentration in Concentrate Composition (wt. %) | 1.12 kg a.i./ha | 1.26 kg a.i./ha |
|---|---|---|---|
| | | % Control of Grass at 28 DAT | |
| 301084 | 43 | 87 | 85 |
| 301087 | 43 | 84 | 83 |
| 301088 | 43 | 84 | 88 |
| 39808 | 45 | 85 | 87 |
| WARRANT | 33 | 82 | 84 |
| | | % Control of Broadleaf Weeds at 28 DAT | |
| 301084 | 43 | 84 | 84 |
| 301087 | 43 | 84 | 82 |
| 301088 | 43 | 86 | 86 |
| 39808 | 45 | 82 | 85 |
| WARRANT | 33 | 78 | 82 |

Example 4: Crop Safety of High Load Microencapsulated Acetochlor Compositions

Greenhouse tests were conducted to evaluate soybean crop safety for post-emergence application for application mixtures prepared from selected concentrate compositions prepared in accordance with Example 1. The acetochlor use rates for these compositions were 1260 g a.i./ha and 2520 g a.i./ha.

Soybean seeds were planted in 3.5-inch square plastic pots filled with a potting media of 75% silt loam and 25% Redi-earth (Sun Gro, Bellevue, Wash.). The temperature conditions were 22° C. day and 17° C. night with 14 hours of supplemental light (approximately 600 microeinsteins). The pots are placed in an environment equipped with sub-irrigation. Overhead irrigation water was also applied as needed to maintain soil moisture. The application mixtures containing the microcapsules were applied to the plants with a track sprayer generally using a Teej et 9501 spray nozzle or similar nozzle with air pressure set at a minimum of 165 kPa. The spray nozzle was 16 inches above the top of the plants and a spray volume rate of about 94 L per hectare was applied. The plants were sprayed at the V2-V3 growth stage.

Table 5 presents the crop injury results at 14 days after treatment. Injury on soybeans was observed as minor necrosis and leaf strapping. At the 1260 g a.i./ha rate, injury was <5%, and at the 2520 g a.i./ha rate, injury was <10%.

TABLE 5

Summary of Crop Safety Results

| Composition | Acetochlor Concentration in Concentrate Composition (wt. %) | Acetochlor Use Rate g a.i./ha | Soybean Crop Injury (14 DAT) |
|---|---|---|---|
| 10022479-0 | 33 | 1260 | 3.0 |
| 10022479-0 | 33 | 2520 | 4.5 |
| 10022479-1a | 42 | 1260 | 5.0 |
| 10022479-1a | 42 | 2520 | 9.5 |
| 10022479-1b | 42 | 1260 | 4.0 |
| 10022479-1b | 42 | 2520 | 5.8 |
| 10022479-2b | 42 | 1260 | 4.0 |
| 10022479-2b | 42 | 2520 | 9.0 |
| 10022479-3a | 42 | 1260 | 5.0 |
| 10022479-3a | 42 | 2520 | 8.0 |

Example 5: Microencapsulated Acetochlor Compositions Reduced Additives

A series of dispersions of high load microencapsulated acetochlor compositions were prepared according to the general procedure in Example 1, except that several additives were eliminated from the compositions including the diluent (ISOPAR M), a dispersant (Invalon DAM), defoamer (Agnique DFM-111S), structure-breaking agent (urea), glycerin, ammonium caseinate, and citric acid. The compositions are summarized in Table 6.

TABLE 6

| | Formulation No. | | | | | |
|---|---|---|---|---|---|---|
| Ingredient | 118-12b | 118-12c | 118-12d | 118-12e | 118-12f | 118-12J |
| Acetochlor (%) Loading | 50.4 | 50.5 | 51.5 | 56 | 52 | 54 |
| Desmodur N 3215 (%) | 3.4 | 2.86 | 2.29 | 1.7 | 1.14 | 1.7 |
| Sokalan CP9 (%) | 2.9 | 2.9 | 2.9 | 2.9 | 2.9 | 2.9 |
| TETA (50%) | 1.54 | 1.27 | 1 | 0.74 | 0.49 | 0.74 |
| Kelzan CC | 0.09 | 0.09 | 0.09 | 0.09 | 0.09 | 0.09 |
| Proxel | 0.06 | 0.06 | 0.06 | 0.06 | 0.06 | 0.06 |
| Agnique DFM-111S | 0.01 | 0.01 | 0.01 | 0.01 | 0.01 | 0.01 |
| Water | 41.6 | 42.3 | 42.15 | 38.5 | 43.31 | 40.5 |

Readily extractable acetochlor of the microcapsules in these compositions was determined by extracting the acetochlor from the concentrate composition with weak solvent such as an aliphatic hydrocarbon solvent and analyzing the extract. Table 7 presents the results of this analysis.

TABLE 7

Readily Extractable Acetochlor

| Composition | Readily Extractable Acetochlor (wt. % of total acetochlor) |
|---|---|
| 118-12b | 0.032 |
| 118-12c | 0.041 |
| 118-12d | 0.042 |
| 118-12e | 0.05 |
| 118-12f | 0.1 |
| 118-12j | 0.05 |

Example 6: Weed Efficacy of Microencapsulated Acetochlor Compositions Reduced Additives Greenhouse tests were conducted to evaluate pre-emergence weed control on waterhemp (AMATA) and proso millet (PANMI). Application mixtures were prepared from selected concentrate compositions prepared in accordance with Example 5.

The weed seeds were planted in 3.5-inch square plastic pots filled with a potting media of 50% silt loam soil and 50% Redi-earth (Sun Gro, Bellevue, Wash.) with 100 g/cu-ft Osmocote 14-14-14 slow release fertilizer. Growth conditions were 27° C. day and 21° C. night with 16 hours of supplemental light (approximately 600 microeinsteins). The pots are placed in an environment equipped with sub-irrigation. Overhead irrigation water was also applied as needed to maintain soil moisture. Application mixtures containing the microcapsules were applied to the plants with a track sprayer generally using a Teej et 9501E spray nozzle or similar nozzle with air pressure set at a minimum of 165 kPa. The spray nozzle was 16 inches above the top of the plants and a spray volume rate of about 94 L per hectare was applied.

Table 8 presents the weed control for waterhemp and proso millet at 0, 7, 14, 21, 28 and 35 days. Residual efficacy was compared to WARRANT.

TABLE 8

| Composition | 0 Days | 7 Days | 14 Days | 21 Days | 28 Days | 35 Days |
|---|---|---|---|---|---|---|
| | % Control of Waterhemp | | | | | |
| WARRANT | 97.2 | 81.7 | 97.9 | 97.6 | 97.2 | 98.9 |
| 118-12b | 100.0 | 82.6 | 89.4 | 96.6 | 90.0 | 96.1 |
| 118-12c | 98.3 | 81.1 | 86.1 | 95.0 | 88.7 | 87.8 |
| 118-12d | 93.3 | 85.0 | 91.4 | 95.1 | 85.3 | 93.9 |
| 118-12e | 99.4 | 96.4 | 98.9 | 99.4 | 98.3 | 98.7 |
| 118-12f | 100.0 | 99.4 | 100.0 | 100.0 | 98.3 | 98.9 |
| 118-12j | 99.4 | 100.0 | 99.0 | 100.0 | 100.0 | 98.9 |
| | % Control of Proso Millet | | | | | |
| WARRANT | 54.4 | 69.4 | 26.7 | 73.3 | 72.2 | 79.8 |
| 10049118-12b | 27.8 | 18.9 | 18.9 | 32.2 | 37.8 | 53.3 |
| 10049118-12c | 65.6 | 36.7 | 15.6 | 71.7 | 55.6 | 72.6 |
| 10049118-12d | 39.3 | 38.9 | 11.1 | 65.0 | 43.9 | 75.6 |
| 10049118-12e | 91.7 | 92.0 | 62.2 | 88.1 | 89.2 | 98.1 |
| 10049118-12f | 100.0 | 98.9 | 98.0 | 100.0 | 89.2 | 99.4 |
| 10049118-12j | 97.6 | 98.3 | 86.1 | 97.2 | 98.7 | 100.0 |

Example 7: Weed Control Under Greenhouse Conditions

Greenhouse tests were conducted to evaluate pre-emergence weed control on Palmer amaranth (AMAPA), waterhemp (AMATA), and Proso Millet (PANMI) for herbicidal application mixtures prepared from selected concentrate compositions prepared in accordance with either Example 1 or 5. Weed control for the application mixtures was compared to that for application mixtures of WARRANT.

The weed seeds were planted in 3.5-inch square plastic pots filled with a potting media of 50% silt loam soil and 50% Redi-earth (Sun Gro, Bellevue, Wash.) with 100 g/cu-ft Osmocote 14-14-14 slow release fertilizer. Growth conditions were 28° C. day and 21° C. night with 16 hours of supplemental light (approximately 600 microeinsteins). Overhead irrigation water was applied only as needed to maintain soil moisture. The application mixtures containing the microcapsules were applied to immediately after planting the seeds with a track sprayer at 140 L/ha (15 GPA) with a XR9501E nozzle. Visual ratings (% control) were collected 21 days after treatment (DAT).

The results of this greenhouse study are presented in Table 9. All application mixtures tested had equivalent or higher weed efficacy than WARRANT at both rates across all the three weed species. HL-0718-1 and HL-0718-2 are 52%, and HL-0718-3 has 56% acetochlor loading.

TABLE 9

| Composition | Composition Type (Example) | Acetochlor Concentration in Concentrate Composition (wt. %) | Mean Particle Size (μm) | Use Rate (g a.i./ha) | % Control 21-DAT | | |
|---|---|---|---|---|---|---|---|
| | | | | | AMAPA | AMATA | PANMI |
| 10061060 | 1 | 43.5 | 8.5 | 630 | 49.4 | 94.3 | 97.3 |
| 10061060 | 1 | 43.5 | 8.5 | 1260 | 73.1 | 97.3 | 98.5 |
| 10061061 | 1 | 43.5 | 7.8 | 630 | 61.3 | 94.5 | 92.9 |
| 10061061 | 1 | 43.5 | 7.8 | 1260 | 77.3 | 98.5 | 98.6 |
| 10061062 | 1 | 43.5 | 8.2 | 630 | 60.6 | 97.0 | 96.1 |
| 10061062 | 1 | 43.5 | 8.2 | 1260 | 79.8 | 96.9 | 99.1 |
| 10061063 | 1 | 43.5 | 7.5 | 630 | 55.6 | 95.3 | 95.0 |
| 10061063 | 1 | 43.5 | 7.5 | 1260 | 85.4 | 95.6 | 98.8 |
| HL-0718-1 | 5 | 52 | 9.5 | 630 | 30.7 | 94.1 | 50.6 |
| HL-0718-1 | 5 | 52 | 9.5 | 1260 | 46.9 | 94.9 | 88.6 |

TABLE 9-continued

| Composition | Composition Type (Example) | Acetochlor Concentration in Concentrate Composition (wt. %) | Mean Particle Size (μm) | Use Rate (g a.i./ha) | % Control 21-DAT | | |
|---|---|---|---|---|---|---|---|
| | | | | | AMAPA | AMATA | PANMI |
| HL-0718-2 | 5 | 52 | 10 | 630 | 33.1 | 89.9 | 27.5 |
| HL-0718-2 | 5 | 52 | 10 | 1260 | 44.4 | 94.3 | 61.0 |
| HL-0718-3 | 5 | 56 | 10 | 630 | 21.3 | 88.9 | 21.3 |
| HL-0718-3 | 5 | 56 | 10 | 1260 | 42.5 | 94.9 | 63.8 |
| WARRANT | — | 33 | 10 | 630 | 21.3 | 87.5 | 17.5 |
| WARRANT | — | 33 | 10 | 1260 | 26.3 | 94.4 | 35.6 |

Example 8: Crop Safety Under Greenhouse Conditions

Greenhouse tests were conducted to evaluate soybean crop safety for post-emergence application for application mixtures prepared from selected concentrate compositions prepared in accordance with either Example 1 or 5. The acetochlor use rates for these compositions were 1260 g a.i./ha and 2520 g a.i./ha.

DT soybean and DT cotton seeds were planted. These seeds were planted in 3.5-inch square plastic pots filled with a potting media of 75% silt loam and 25% Redi-earth (Sun Gro, Bellevue, Wash.). The temperature conditions were 22° C. day and 17° C. night with 14 hours of supplemental light (approximately 600 microeinsteins). The pots are placed in an environment equipped with sub-irrigation. Overhead irrigation water was also applied as needed to maintain soil moisture. The application mixtures containing the microcapsules were applied to the plants with a track sprayer generally using a TTI110015 nozzle spray nozzle. The spray nozzle was 16 inches above the top of the plants and a spray volume rate of about 140 L/ha was applied. The plants were sprayed to the soybeans at the V3 growth stage and to 4-5 node cotton. Visual ratings (% control) were collected at 7-10 DAT.

Table 10 presents the crop injury results. All application mixtures had similar crop safety as commercial warrant on both DT soy and cotton (<10%).

TABLE 10

| Composition | Composition Type (Example) | Acetochlor Concentration in Concentrate Composition (wt. %) | Mean Particle Size (μm) | Use Rate (g a.i./ha) | % Injury 10-DAT | |
|---|---|---|---|---|---|---|
| | | | | | DT soy | DT cotton |
| 10061060 | 1 | 43.5 | 8.5 | 1260 | 6.5 | 0.5 |
| 10061060 | 1 | 43.5 | 8.5 | 2520 | 6.2 | 1.5 |
| 10061061 | 1 | 43.5 | 7.8 | 1260 | 3.0 | 1.0 |
| 10061061 | 1 | 43.5 | 7.8 | 2520 | 8.2 | 0.5 |
| 10061062 | 1 | 43.5 | 8.2 | 1260 | 6.2 | 0.5 |
| 10061062 | 1 | 43.5 | 8.2 | 2520 | 8.3 | 1.3 |
| 10061063 | 1 | 43.5 | 7.5 | 1260 | 5.3 | 1.0 |
| 10061063 | 1 | 43.5 | 7.5 | 2520 | 8.2 | 1.3 |
| HL-0718-1 | 5 | 52 | 9.5 | 1260 | 7.8 | 1.8 |
| HL-0718-1 | 5 | 52 | 9.5 | 2520 | 9.0 | 2.5 |
| HL-0718-2 | 5 | 52 | 10 | 1260 | 5.7 | 1.5 |
| HL-0718-2 | 5 | 52 | 10 | 2520 | 5.3 | 2.8 |
| HL-0718-3 | 5 | 52 | 10 | 1260 | 3.5 | 0.0 |
| HL-0718-3 | 5 | 52 | 10 | 2520 | 7.7 | 1.3 |
| HL-0718-4 | 5 | 56 | 8 | 1260 | 4.0 | 0.5 |
| HL-0718-4 | 5 | 56 | 8 | 2520 | 6.2 | 2.3 |
| WARRANT | — | 33 | 10 | 1260 | 2.2 | 1.0 |
| WARRANT | — | 33 | 10 | 2520 | 4.5 | 4.0 |

Example 9: Release Study

For the purposes of estimating the crop safety of the microencapsulated acetochlor compositions, the acetochlor release rate profile was measured in the laboratory using a SOTAX AT-7 (SOTAX Corporation; Horsham, Pa. 19044) agitated dissolution test apparatus. Composition 10049117 at 45 wt. % acetochlor was prepared in accordance with Example 1 with deionized water at 25° C. to an acetochlor concentration of 1% by weight of the microencapsulated acetochlor herbicide active ingredient. An aliquot of each solution was sampled at periodically from 0 to 264 hours. Each aliquot was filtered through a syringe filter (TARGET Cellulose Acetate 0.2 μm, ThermoFisher Scientific) to remove any capsules. The resulting solution was then analyzed for acetochlor by HPLC. The results of the release rate tests are presented in Table 11.

TABLE 11

| Time (hrs) | Acetochlor Release (PPM) 10049117 |
|---|---|
| 0 | 16 |
| 4 | 24 |
| 24 | 53 |
| 144 | 68 |
| 192 | 75 |
| 264 | 80 |

The release rate tests show that the microcapsules exhibited controlled release over the course of the tests.

Example 10: Pre-Mix Concentrates

The concentrate compositions comprising microencapsulated acetochlor (Warrant) were mixed with sodium dicamba or DGA dicamba. These herbicidal concentrate compositions were subjected to stability testing at 54° C. for 1-2 weeks. The weight % of acetochlor and dicamba lost after the testing period was used as a measure of chemical stability. Table 12 shows that the loss of acetochlor and dicamba was limited.

TABLE 12

| Composition | Acetochlor Loss | Dicamba Loss |
|---|---|---|
| WD-0418-9 (1 Week) (Acetochlor + Na Dicamba) | 0.748 | 2.273 |
| WD-0418-12 (2 Weeks) (Acetochlor + Na Dicamba) | 2.368 | 5.100 |
| WD-0418-30 (1 Week) (Acetochlor + DGA Dicamba) | 1.5417 | 3.0778 |
| WD-0418-38 (2 Weeks) (Acetochlor + DGA Dicamba) | 3.483 | 6.538 |

Example 11: Cotton Crop Safety in the Field

Field experiments were conducted in at various field locations. A group unbalanced block (GUBD) design with four replications was used in all the trials. Field preparation consisted of a fall disking followed by a spring disking and two passes in opposite directions with a two-way bed conditioner equipped with rolling baskets and S-tine harrows set to operate 6 cm deep. Bollgard II® XtendFlex™ Cotton|Genuity® cotton was planted with 30-38 inch row spacing. Application mixtures prepared from selected concentrate compositions prepared in accordance with Example 1 were applied to 4-5 node cotton and then again at 8-10 node cotton using a $CO_2$ pressurized backpack sprayer fitted with Teej et TTI110015 nozzles calibrated to deliver 140l/ha. The spray nozzle was 50 cm above the top of the top of the crop canopy. In all trials, visual estimates of crop injury and growth reduction were recorded at 3, 7, 14, and 21 days after treatment (DAT) on a 0 to 100% scale where 0=no injury or growth reduction compared to untreated check and 100=plant death. Data were analyzed using MIXED procedure of SAS (SAS 2003). Trials and replications within trial were considered random effects and herbicide treatments were considered fixed effects. Type III statistics were used to test significance of fixed effects. Equivalence test with an upper equivalence bound of 10 and alpha level of 0.1 was used to compare new formulations to the commercial formulation. Least square means were used and mean separation was carried out using Fischer's protected LSD at $\alpha=0.1$ to further compare new formulations to each other.

Data from observation timings when maximum injury was observed is presented in Table 13. In general, observations were at 3 DAT. All the application mixtures of microencapsulated acetochlor when applied postemergence to cotton were equivalent in crop safety to the commercial formulation WARRANT. No differences were observed between the formulations when applied in tank mix with Roundup PowerMax or Roundup Xtend.

TABLE 13

Crop Safety in Cotton

| Herbicides | Rates 1X = 1.125 AI #/A + 1 AE #/A 2X = 2.25 AI #/A + 2 AE #/A | 3 DAT (4-5 node) | 3 DAT (8-10 node) |
|---|---|---|---|
| Warrant | | 3 | 5 |
| Dual Magnum + Roundup PMax | 1X with gly | 30 | 23 |
| Warrant + Roundup PMax | 1X with gly | 5 | 7 |
| 39808 + Roundup PMax | 1X with gly | 10 | 10 |
| 301084 + Roundup PMax | 1X with gly | 8 | 11 |
| 301087 + Roundup PMax | 1X with gly | 9 | 9 |
| 301088 + Roundup PMax | 1X with gly | 8 | 11 |
| Roundup PMax | 2X with gly | 10 | 7 |
| Warrant | | 4 | 9 |
| Dual Magnum + Roundup PMax | 2X with gly | 40 | 33 |
| Warrant + Roundup PMax | 2X with gly | 11 | 12 |
| 39808 + Roundup PMax | 2X with gly | 18 | 15 |
| 301084 + Roundup PMax | 2X with gly | 17 | 15 |
| 301087 + Roundup PMax | 2X with gly | 16 | 14 |
| 301088 + Roundup PMax | 2X with gly | 18 | 15 |
| MON 119151 | 1X with Xtend | 20 | 10 |
| Dual Magnum + MON 119151 | 1X with Xtend | 31 | 20 |
| Warrant + MON 119151 | 1X with Xtend | 17 | 10 |
| 39808 + MON 119151 | 1X with Xtend | 18 | 13 |
| 301084 + MON 119151 | 1X with Xtend | 19 | 12 |
| 301087 + MON 119151 | 1X with Xtend | 17 | 12 |
| 301088 + MON 119151 | 1X with Xtend | 17 | 11 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions, methods and processes without departing from the scope of the invention, it is intended that all matter contained in the above description and shown in the accompanying drawings shall be interpreted as illustrative and not in a limiting sense.

Having described the invention in detail, it will be apparent that modifications and variations are possible without departing from the scope of the invention defined in the appended claims.

What is claimed is:

1. A stable herbicidal concentrate composition comprising microcapsules dispersed in an aqueous liquid medium, wherein the microcapsules comprise a core material comprising a chloroacetanilide herbicide and a shell wall comprising a polyurea encapsulating the core material, and wherein the composition has a chloroacetanilide herbicide concentration on an active ingredient basis of at least about 40 wt. % and a weight ratio of chloroacetanilide herbicide to shell wall that is at least 14:1.

2. The composition of claim 1, wherein the composition contains no more than about 15 wt. % of unencapsulated additives, excluding water and co-herbicide(s).

3. The composition of claim 1, wherein the chloroacetanilide herbicide concentration on an active ingredient basis is from about 40 wt. % to about 60 wt. %.

4. The composition of claim 1, wherein the chloroacetanilide herbicide concentration on an active ingredient basis is from about 42 wt. % to about 60 wt. % and the weight ratio of chloroacetanilide herbicide to shell wall is from 14:1 to about 30:1.

5. The composition of claim 1, wherein the composition has a water concentration that is from about 5 wt. % to about 25 wt. %.

6. The composition of claim 1, wherein the chloroacetanilide herbicide comprises at least one herbicide selected from the group consisting of acetochlor, alachlor, butachlor, butenachlor, delachlor, diethatyl, dimethachlor, metazochlor, metolachlor, S-metolachlor, pretilachlor, propachlor, propisochlor, prynachlor, terbuchlor, thenylchlor and xylachlor, stereoisomers thereof, and mixtures thereof.

7. The composition of claim 1, wherein the core material further comprises a safener, wherein the safener is selected from the group consisting of furilazole ((RS)-3-(dichloroacetyl)-5-(2-furanyl)-2,2-dimethyl-1,3-oxazolidine 95%); AD 67 (4-(dichloroacetyl)-1-oxa-4-azaspiro[4,5]decane); benoxacor ((RS)-4-dichloroacetyl-3,4-dihydro-3-methyl-2H-1,4-benzoxazine); cloquintocet-mexyl ((5-chloroquinolin-8-yloxy)acetic acid); cyometrinil ((Z)-cyanomethoxyimino(phenyl)acetonitrile); cyprosulfamide (N-[4-(cyclopropylcarbamoyl)phenylsulfonyl]-o-anisamide); dichlormid (N, N-diallyl-2, 2-dichloroacetamide); dicyclonon ((RS)-1-dichloroacetyl-3,3,8a-trimethylperhydropyrrolo[1,2-a]pyrimidin-6-one); dietholate (O,O-diethyl O-phenyl phosphorothioate); fenchlorazole-ethyl (1-(2,4-dichlorophenyl)-5-trichloromethyl-1H-1,2,4-triazole-3-carboxylic acid); fenclorim (6-dichloro-2-phenylpyrimidine); flurazole (benzyl 2-chloro-4-trifluoromethyl-1,3-thiazole-5-carboxylate); fluxofenim (4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil ((Z)-1,3-dioxolan-2-ylmethoxyimino(phenyl)acetonitrile); isoxadifen (4,5-dihydro-5,5-diphenyl-1,2-oxazole-3-carboxylic acid); cyprosulfamide; salts and esters thereof, and mixtures thereof.

8. The composition of claim 1, wherein the composition further comprises at least one co-herbicide and wherein the co-herbicide comprises a salt of dicamba; a salt of 2,4-D; glyphosate or a salt or ester thereof; or glufosinate or a salt or ester thereof.

9. The composition of claim 1, wherein the composition further comprises at least one co-herbicide and wherein the co-herbicide comprises:

at least one auxin herbicide selected from the group consisting of 3,6-dichloro-2-methoxybenzoic acid (dicamba); 2,4-dichlorophenoxyacetic acid (2,4-D); 4-(2, 4-dichlorophenoxy)butyric acid (2,4-DB); dichlorprop; 2-methyl-4-chlorophenoxyacetic acid (MCPA); 4-(4-chloro-2-methylphenoxy)butanoic acid (MCPB); 4-chlorophenoxyacetic acid; 2,4,5-tri chlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; butyl 4-amino-3-chloro-5-fluoro-6-(7-fluoro-1H-indol-6-yl)pyridine-2-carboxylate; and salts and esters thereof; and mixtures thereof;

at least one PPO inhibitor selected from the group consisting of acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil, sulfentrazone, ethyl 2-((3-(2-chloro-4-fluoro-5-(3-methyl-2,6-dioxo-4-(trifluoromethyl)-3,6-dihydropyrimidin-1(2H)-yl)phenoxy)pyridin-2-yl)oxy)acetate, salts and esters thereof, and mixtures thereof;

at least one HPPD inhibitor selected from the group consisting of aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, tolpyralate, topramezone, and tefuryltrione salts and esters thereof, and mixtures thereof;

at least one ACCase inhibitor selected from the group consisting of alloxydim, butroxydim, clethodim, cycloxydim, pinoxaden, sethoxydim, tepraloxydim, tralkoxydim, chlorazifop, clodinafop, clofop, cyhalofop, diclofop, fenoxaprop, fenthiaprop, fluazifop, haloxyfop, isoxapyrifop, metamifop, propaquizafop, quizalofop and trifop, salts and esters thereof, and mixtures thereof;

at least one PS II inhibitor selected from the group consisting of ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof;

at least one acetolactate ALS or AHAS inhibitors selected from the group consisting of amidosulfuron, azimsulfuron, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thifensulfuron-methyl, triasulfuron, tribenuron-methyl, trifloxysulfuron and triflusulfuron-methyl, salts and esters thereof, and mixtures thereof;
- at least one PS I inhibitor selected from the group consisting of diquat and paraquat, salts and esters thereof, and mixtures thereof;
- at least one mitosis inhibitor selected from the group consisting of anilofos, benefin, DCPA, dithiopyr, ethalfluralin, flufenacet, mefenacet, oryzalin, pendimethalin, thiazopyr and trifluralin, salts and esters thereof, and mixtures thereof;
- at least one cellulose inhibitor selected from the group consisting of dichlobenil and isoxaben, and mixtures thereof; or the oxidative phosphorylation uncoupler dinoterb and/or esters thereof;
- at least one fatty acid and lipid biosynthesis inhibitor selected from the group consisting of bensulide, butylate, cycloate, EPTC, esprocarb, molinate, pebulate, prosulfocarb, thiobencarb, triallate and vernolate, salts and esters thereof, and mixtures thereof;
- at least one auxin transport inhibitor selected from the group consisting of diflufenzopyr and naptalam, salts and esters thereof, and mixtures thereof
- a protoporphyrinogen oxidase inhibitor selected from the group consisting of acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof;
- a carotenoid biosynthesis inhibitor selected from the group consisting of aclonifen, amitrole, beflubutamid, benzofenap, clomazone, diflufenican, fluridone, flurochloridone, flurtamone, isoxaflutole, mesotrione, norflurazon, picolinafen, pyrazolynate, pyrazoxyfen, sulcotrione, tembotrione and topramezone, salts and esters thereof, and mixtures thereof; or
- the dihydropteroate synthase inhibitor asulam and/or salts thereof.

10. The composition of claim 1, wherein the composition further comprises at least one co-herbicide and wherein the weight ratio of total microencapsulated herbicide to co-herbicide is from about 1:30 to about 30:1.

11. The composition of claim 1, further comprising at least one auxin co-herbicide and an additive to control or reduce potential herbicide volatility comprising a monocarboxylic acid or monocarboxylate thereof.

12. The composition of claim 11, wherein the monocarboxylate is selected from the group consisting of formate salts, acetate salts, propionate salts, benzoate salts, phenylacetate salts, and mixtures thereof and/or the monocarboxylic acid is selected from the group consisting of formic acid, acetic acid, propionic acid, benzoic acid, phenylacetic acid, and mixtures thereof.

13. The composition of claim 1, wherein the chloroacetanilide herbicide concentration on an active ingredient basis is from about 42 wt. % to about 55 wt. % and the weight ratio of chloroacetanilide herbicide to shell wall is from 15:1 to about 20:1.

14. The composition of claim 1, wherein the composition comprises a weight ratio of chloroacetanilide herbicide to shell wall of from 15:1 to about 30:1.

15. The composition of claim 1, wherein the chloroacetanilide herbicide concentration on an active ingredient basis is from about 40 wt. % to about 60 wt. % and the weight ratio of chloroacetanilide herbicide to shell wall is at least 18:1.

16. The composition of claim 15, wherein the weight ratio of chloroacetanilide herbicide to shell wall is from about 20:1 to about 30:1.

17. The composition of claim 1, wherein the shell wall is formed in a polymerization medium by a polymerization reaction between a polyisocyanate component comprising a polyisocyanate or mixture of polyisocyanates and a polyamine component comprising a polyamine or mixture of polyamines to form the polyurea and the ratio of amine molar equivalents contained in the polyamine component to isocyanate molar equivalents contained in the polyisocyanate component is from about 1.15:1 to about 1.4:1.

18. The composition of claim 1, wherein the microcapsules are characterized as having a mean particle size range of from about 4 μm to about 15 μm.

19. The composition of claim 1, wherein the chloroacetanilide herbicide comprises at least one herbicide selected from the group consisting of acetochlor, alachlor, butachlor, metolachlor, S-metolachlor, stereoisomers thereof, and mixtures thereof.

20. The composition of claim 1, wherein the chloroacetanilide herbicide comprises acetochlor.

21. A method for controlling weeds in a field of a crop plant, the method comprising applying to the field an application mixture comprising the aqueous herbicidal composition of claim 1 or dilution thereof.

22. The method of claim 21, further comprising mixing a co-herbicide with the aqueous herbicidal composition, dilution thereof, or the application mixture.

23. A stable herbicidal concentrate composition comprising microcapsules dispersed in an aqueous liquid medium, wherein the microcapsules comprise a core material comprising a chloroacetanilide herbicide and a shell wall comprising a polyurea encapsulating the core material, wherein the composition has a chloroacetanilide herbicide concentration on an active ingredient basis of at least about 40 wt. % and contains from about 0.5 wt. % to about 5 wt. % of unencapsulated additives, excluding water and co-herbicide(s), and wherein the weight ratio of chloroacetanilide herbicide to shell wall is at least 14:1.

24. The composition of claim 23, wherein the total concentration of unencapsulated additives, excluding water and co-herbicides, is from about 0.5 wt. % to about 3 wt. % of the composition.

25. The composition of claim 23, wherein the chloroacetanilide herbicide concentration on an active ingredient basis is at least about 50 wt. %.

26. The composition of claim 23, wherein the microcapsules are substantially free of a diluent.

27. The composition of claim 23, wherein the composition contains no more than about 3 wt. % of total dispersant.

28. The composition of claim 23, wherein the composition is essentially free of a polymeric naphthalene sulfonate salt.

29. The composition of claim 23, wherein the chloroacetanilide herbicide concentration on an active ingredient basis is from about 50 wt. % to about 60 wt. %.

30. A stable herbicidal concentrate composition comprising microcapsules dispersed in an aqueous liquid medium, wherein the microcapsules comprise a core material comprising a chloroacetanilide herbicide and a shell wall comprising a polyurea encapsulating the core material; wherein the composition has a chloroacetanilide herbicide concentration on an active ingredient basis of at least about 40 wt. % and a weight ratio of chloroacetanilide herbicide to shell wall that is at least 14:1; and wherein the chloroacetanilide herbicide comprises acetochlor.

* * * * *